US012580448B2

(12) United States Patent
White et al.

(10) Patent No.: US 12,580,448 B2
(45) Date of Patent: Mar. 17, 2026

(54) ELECTROMAGNETICALLY-CONTROLLED MAGNETIC CYCLOIDAL GEAR ASSEMBLY FOR ACHIEVING ENHANCED TORQUE CAPACITY AND METHOD OF OPERATING SAME

(71) Applicant: Kaney Aerospace, Inc., Rockford, IL (US)

(72) Inventors: Adam White, Beavercreek, OH (US); Erik Michael Plugge, Rockford, IL (US); Donald Fredrick Knight, Davis, IL (US)

(73) Assignee: Kaney Aerospace, Inc., Rockford, IL (US)

(*) Notice: Subject to any disclaimer, the term of this patent is extended or adjusted under 35 U.S.C. 154(b) by 913 days.

(21) Appl. No.: 17/581,450

(22) Filed: Jan. 21, 2022

(65) Prior Publication Data

US 2023/0238858 A1 Jul. 27, 2023

(51) Int. Cl.
| | |
|---|---|
| *H02K 7/116* | (2006.01) |
| *H02K 7/00* | (2006.01) |
| *H02K 11/30* | (2016.01) |

(52) U.S. Cl.
CPC ............. *H02K 7/116* (2013.01); *H02K 7/003* (2013.01); *H02K 11/30* (2016.01)

(58) Field of Classification Search
CPC ........ H02K 7/116; H02K 7/003; H02K 11/30; H02K 51/00
See application file for complete search history.

(56) References Cited

U.S. PATENT DOCUMENTS

| | | | |
|---|---|---|---|
| 7,973,441 B2 | 7/2011 | Atallah | |
| 10,763,772 B1 * | 9/2020 | Fatemi | H02P 25/086 |
| 10,784,762 B1 | 9/2020 | Grundmann et al. | |
| 2019/0222096 A1 * | 7/2019 | Bastian, II | H02K 7/12 |

FOREIGN PATENT DOCUMENTS

WO 2017/058228 4/2017

* cited by examiner

*Primary Examiner* — Christopher M Koehler
*Assistant Examiner* — Riley Owen Stout
(74) *Attorney, Agent, or Firm* — Amundsen Davis, LLC

(57) ABSTRACT

The present disclosure relates to electromagnetically-controlled magnetic cycloidal gear assemblies configured to achieve enhanced torque capacity, and methods of operating same. In one example embodiment, a method includes sensing a position of a cycloid relative to a stator, where the stator includes a plurality of electromagnets, and the cycloid includes a plurality of permanent magnets. Also, the method includes determining respective torque characteristics concerning the respective electromagnets based upon the sensed position, where the respective torque characteristic that is determined concerning each respective one of the electromagnets is indicative of a respective relative position of the respective electromagnet in relation to a respective closest one of the permanent magnets. The method additionally includes outputting from a controller, for receipt respectively at least indirectly by the respective electromagnets or respective control devices coupled thereto, a plurality of output signals respectively based at least in part upon the respective torque characteristics.

11 Claims, 12 Drawing Sheets

Figure 8:
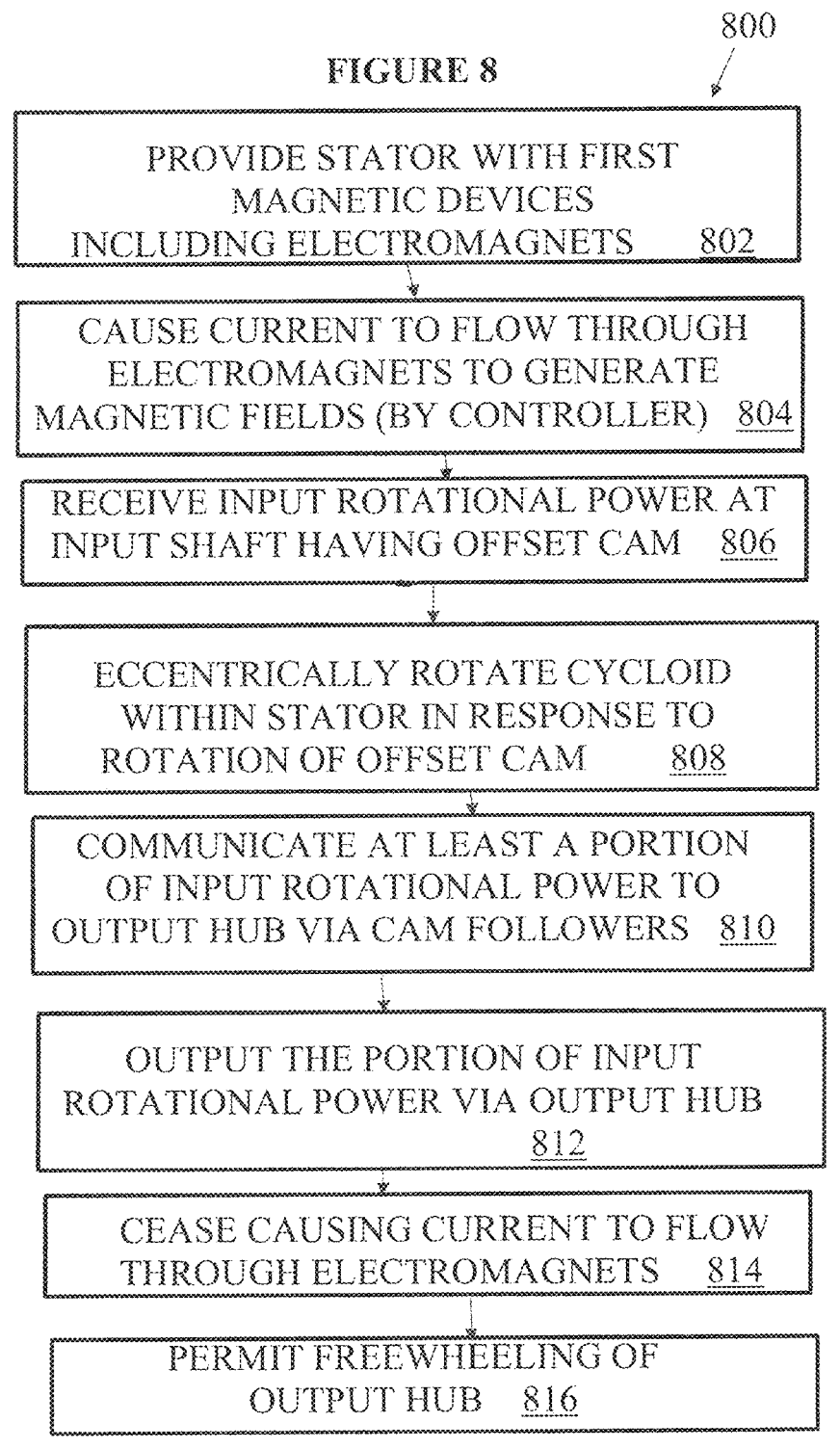

PROVIDE STATOR WITH FIRST
MAGNETIC DEVICES
INCLUDING ELECTROMAGNETS    802

CAUSE CURRENT TO FLOW THROUGH
ELECTROMAGNETS TO GENERATE
MAGNETIC FIELDS (BY CONTROLLER)    804

RECEIVE INPUT ROTATIONAL POWER AT
INPUT SHAFT HAVING OFFSET CAM    806

ECCENTRICALLY ROTATE CYCLOID
WITHIN STATOR IN RESPONSE TO
ROTATION OF OFFSET CAM    808

COMMUNICATE AT LEAST A PORTION
OF INPUT ROTATIONAL POWER TO
OUTPUT HUB VIA CAM FOLLOWERS    810

OUTPUT THE PORTION OF INPUT
ROTATIONAL POWER VIA OUTPUT HUB
812

CEASE CAUSING CURRENT TO FLOW
THROUGH ELECTROMAGNETS    814

PERMIT FREEWHEELING OF
OUTPUT HUB    816

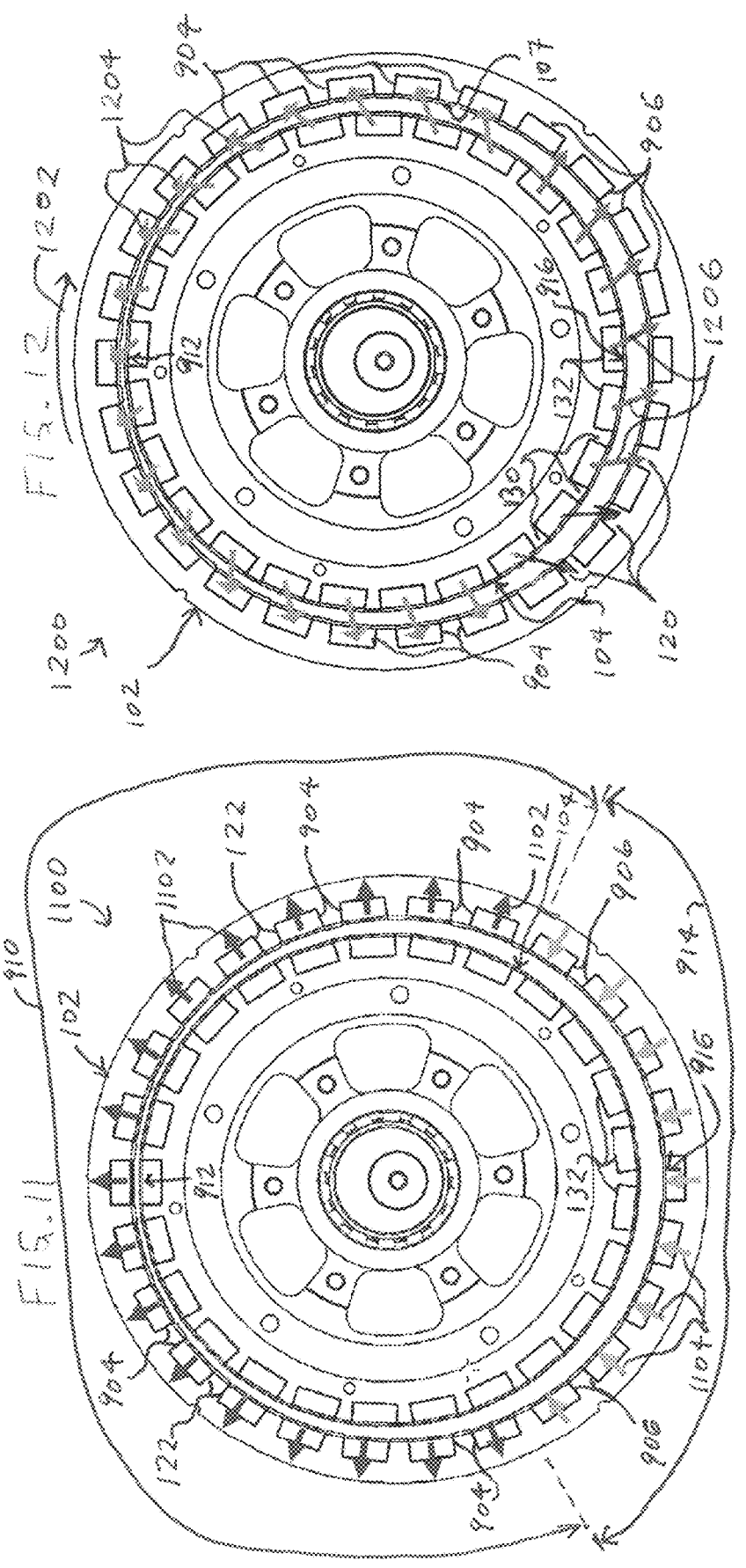

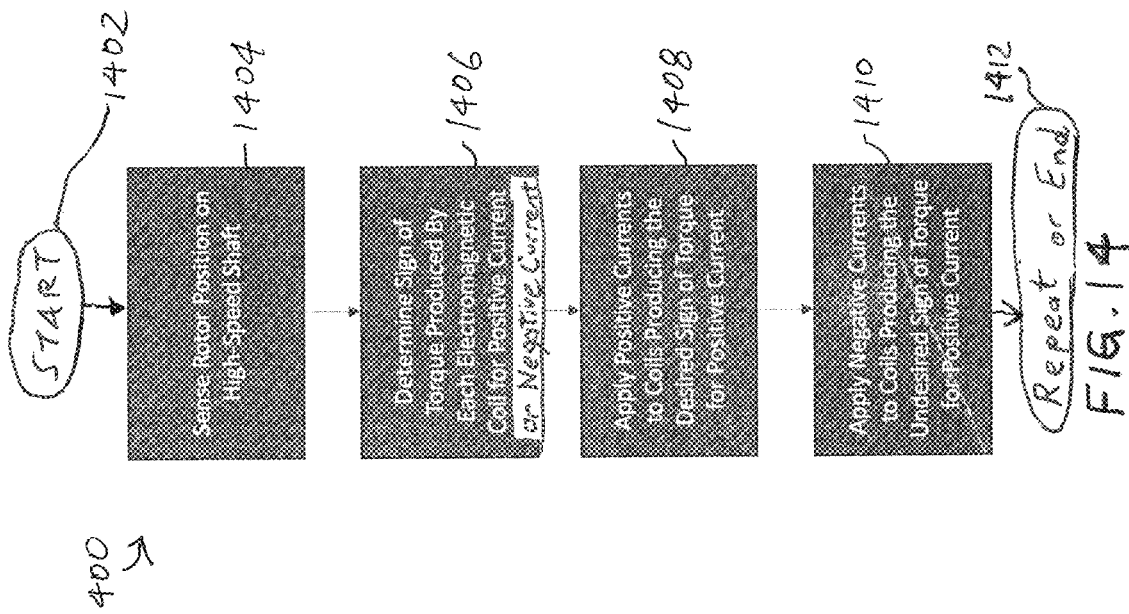

1400

*1402* START

*1404* Sense Rotor Position on High-Speed Shaft

*1406* Determine Sign of Torque Produced by Each Electromagnetic Coil for Positive Current *or Negative Current*

*1408* Apply Positive Currents to Coils Producing the Desired Sign of Torque for Positive Current

*1410* Apply Negative Currents to Coils Producing the Undesired Sign of Torque for Positive Current

*1412* Repeat or End

FIG. 14

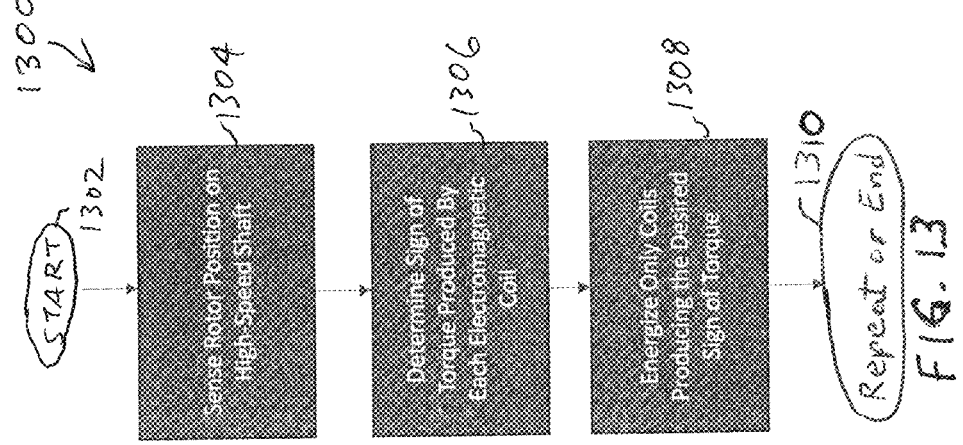

1300

*1302* START

*1304* Sense Rotor Position on High-Speed Shaft

*1306* Determine Sign of Torque Produced By Each Electromagnetic Coil

*1308* Energize Only Coils Producing the Desired Sign of Torque

*1310* Repeat or End

FIG. 13

ELECTROMAGNETICALLY-CONTROLLED MAGNETIC CYCLOIDAL GEAR ASSEMBLY FOR ACHIEVING ENHANCED TORQUE CAPACITY AND METHOD OF OPERATING SAME

STATEMENT REGARDING FEDERALLY SPONSORED RESEARCH OR DEVELOPMENT

This invention was made with government support under Contract No. FA8649-21-P-0208 awarded by the United States Air Force AFRL/SBRK. The government has certain rights in the invention.

CROSS-REFERENCE TO RELATED APPLICATIONS

Field of the Invention

The present invention relates to gearboxes or gear assemblies or systems, and more particularly to magnetic cycloidal gearboxes or gear assemblies or systems, and methods of operating same, in which the gearboxes, gear assemblies, systems, or methods are configured to achieve enhanced torque capacity.

Background of the Invention

Gear assemblies are used in a wide variety of applications in order to transmit speed and torque from rotating power sources to other devices. Often, a gear assembly operates to communicate, for receipt by another device, output speed and output torque that are different from input speed and input torque that are received from a rotating power source. Various mechanical and magnetic gear assemblies are known. One type of known magnetic gear assembly is the magnetic cycloidal gear assembly.

The general principle of a magnetic cycloidal gear assembly can be understood to involve two circular structures of unequal size, with the larger circular structure being stationary, and with the smaller circular structure being positioned within the interior of the larger circular structure and arranged to be tangent (or substantially tangent) to an interior circular edge of the larger circular structure. Given such an arrangement, the smaller circular structure can be configured to rotate within the inside of the larger circular structure, along the interior circular edge, in an eccentric manner. Such rotational motion can be exploited for gearing when the outer, larger circular structure is a stator and the inner, smaller circular structure is a rotor.

More particularly, FIG. 1A is a schematic, front elevation view of a conventional magnetic cycloid gear 10, having a stator 12 and a rotor 14. The stator 12 and rotor 14 are positioned in an eccentric (or non-concentric) manner, such that a rotor axis 20 is displaced with respect to and not aligned with a stator axis 22. An input drive shaft (not shown) that drives the rotor 14 has a central axis that is aligned with the stator axis 22, such that the rotor axis 20 also is displaced with respect to the central axis of the input drive shaft. Although the rotor axis 20 is displaced from the central axis of the input drive shaft, the input drive shaft nevertheless is engaged with the rotor 14 in a manner (e.g., by way of a cam) such that rotation of the input drive shaft causes corresponding rotation of the rotor axis 20 about the stator axis 22, such that the rotor axis 20 follows a trajectory T (shown in the dashed lines).

Although rotation of the input drive shaft causes rotation of the rotor axis 20 about the stator axis 22 that occurs at the same rotational frequency as the rotation of the input drive shaft itself, this is not to say that the entire rotor 14 rotates at that frequency. Rather, magnetic pole pairs 16 are arrayed on the stator 12 and rotor 14, and magnetic interactions between those of the magnetic pole pairs of the stator 12 and rotor 14 that are closest together depending upon the relative positioning of the stator and rotor at any given time, prevent relative "slipping" motion between the stator and rotor. Thus, as governed by the interaction of the magnetic pole pairs 16, rotation of the input drive shaft causes an outer circular edge 24 of the rotor 14 to "roll along" an inner circular edge 18 of the stator 12 (with those edges only being separated by an air gap), in an eccentric manner determined by the rotation of the rotor axis 20 about the stator axis 22.

The amount of rotation that is experienced by the rotor 14 relative to the stator 12 (as the outer circular edge 24 of the rotor rolls along the inner circular edge 18 of the stator) is determined by the difference in the number of pole pairs arranged along the inner circular edge of the stator relative to the number of pole pairs arranged along the outer circular edge of the rotor. In general, because the stator 12 has more pole pairs along the inner circular edge 18 than the rotor 14 has along the outer circular edge 24, the rotor 14 will rotate more than a full revolution for every revolution it travels around the stator 12. The gear ratio is based on the number of pole pairs arrayed on the stator as compared to the number of pole pairs arrayed on the rotor. For example, if the stator has m+1 pole pairs, and the rotor has m pole pairs, then the gear ratio between the two is -1/m. In the embodiment of FIG. 1A, the gear ratio also effectively corresponds to the difference in the circumferences between the inner circular edge 18 and the outer circular edge 24 because magnets of the same size are employed on each of the stator 12 and the rotor 14. But this is not fundamental and, in other embodiments (e.g., embodiments in which the magnets employed on the stator are sized differently than the magnets employed on the rotor), the gear ratio need not correspond particularly to the difference in the circumferences between the inner circular edge of the stator and the outer circular edge of the rotor.

In a magnetic cycloidal gear assembly, the rotor 14 is mounted on (or is formed by) a cycloidal disk. Although not shown in FIG. 1A, it should be appreciated that the cycloidal disk, in addition to being mounted eccentrically on the input shaft as described, is typically coupled to an output structure, which serves to output rotational power from the magnetic cycloidal gear assembly. The output rotational torque and speed provided by the output structure typically differ respectively from the input rotational torque and speed (received via the input shaft) in accordance with the gear ratio established by the pole pairs 16 of the rotor 14 and the stator 12.

Notwithstanding the existence of conventional magnetic cycloidal gear assemblies, such conventional magnetic cycloidal gear assemblies face certain challenges and concerns. Magnetic cycloidal gears assemblies often require large external diameters to achieve the same torque carrying capacity of equivalent mechanical gears (spur, planetary etc.). As such, to act as a direct replacement for mechanical gearboxes in actuation systems, space accommodations must be made, such as increasing the physical envelope or removing other features. Although such accommodations may be possible, such accommodations can involve tradeoffs that result in the loss of features or functions that are desirable.

For example, in the Integrated Servo Actuator and Controller (ISAAC) available from Kaney Aerospace, Inc. of Rockford, IL, the disengage clutch has been removed to accommodate the magnetic gearbox. Yet removal of the disengage clutch is not preferable. If the disengage clutch were present, the disengage clutch would allow the actuator output to fully disengage and freewheel in certain operational circumstances, such as in the case of a manual override. Additionally, although the magnetic cycloidal gearbox can be back-driven when the motor is unpowered, the back-drive torque is significantly higher than the freewheel torque that would arise during freewheeling if the disengage clutch were present. This correspondingly can increase the likelihood that the actuator may jam in a manner that is not easily overridden through manual intervention or by way of a parallel actuator, which may be undesirable in some aerospace applications.

Also, because of the difference in pole pairs between the rotor and stator (e.g., one pole pair between the rotor and stator in the example discussed above), the polarity of adjacent poles is necessarily shifted for the point of maximum airgap relative to the point of minimum airgap. Thus, when the rotor is aligned such that the polarity of adjacent poles of the rotor and stator is common at the point of minimum airgap, the polarity of adjacent poles of the rotor and stator at the point of maximum airgap are in direct opposition. Additionally, as the rotor moves to take up torque, the poles at the minimum airgap will attract each other and the poles at the maximum airgap will repel one another, albeit at a lower force due to the larger air gap. Further, if one considers the magnetic interactions among all of the opposed magnets of the rotor and stator, it will be appreciated that a significant subset of the magnets of the rotor and stator will be acting to repel one another tangentially. Because of such tangential repelling actions, such magnets of the rotor and stator contribute negatively to the overall torque carrying capacity of the rotor.

Such magnetic interactions and consequent effects are illustrated additionally by FIGS. 1B, 1C, and 1D, which show portions of a conventional magnetic cycloidal gear assembly 50. Similar to the magnetic cycloid gear 10 of FIG. 1A, the conventional magnetic cycloidal gear assembly 50 includes both a stator 52 and a rotor (or cycloid) 54. Additionally, the conventional magnetic cycloidal gear assembly 50 of FIGS. 1B, 1C, and 1D also includes magnetic pole pairs 56 as well as an input shaft 58 having an offset cam 60, which is positioned within and supports the rotor (or cycloid) 54 by way of a rolling element bearing 62. Although not shown, it should be appreciated that the input shaft 58 and stator 52 are both concentric about a stator axis (not shown), but that the offset cam 60 is offset with respect to the stator axis. Also, although not shown, the conventional magnetic cycloidal gear assembly 50 includes an output structure by which the gear assembly (and the rotor 54 thereof) serves to output rotational power to a load.

In the present example of FIGS. 1B, 1C, and 1D, the stator 52 particularly includes a back-iron cylinder 64 and m permanent magnets 66 (where, in this example, m=26) that are mounted within the back-iron cylinder and positioned along an inner cylindrical surface 68 of the back-iron cylinder. Each of the permanent magnets 66 is positioned between a respective pair of teeth 70 of the back-iron cylinder 64, and face inwardly towards the stator axis (that is, the central axis) of the stator 52. Additionally, the rotor 54 includes a back-iron cylinder (or disk) 74 and n permanent magnets 76 (where, in this example, n=m-1=25) mounted within the back-iron cylinder and positioned along an outer cylindrical surface 78 of the back-iron cylinder. Each of the permanent magnets 76 is positioned between a respective pair of teeth 80 of the back-iron cylinder 74, and face outwardly toward the stator 52.

Also in this regard, FIG. 1B includes a plurality of outwardly-directed arrows 72 that are respectively representative of magnetic flux passing through and out of the permanent magnets 66 of the stator 52. Further, FIG. 1C includes a plurality of outwardly-directed arrows 82 that are respectively representative of magnetic flux passing through and out of the permanent magnets 76 of the rotor 54. In general, the arrows 72 are radially-outwardly directed away from the stator axis (e.g., the central axis) of the stator 52, and the arrows 82 are radially-outwardly directed away from a rotor axis (e.g., a central axis of the rotor 54), given the positioning of the permanent magnets 66 and 76, respectively. Further, it should be appreciated that, although each of the arrows 72 and 82 in FIGS. 1B and 1C is outwardly directed, the magnetic flux emanating from each of the respective permanent magnets 66 and 76 generally follows looping paths around each respective permanent magnet as the magnetic flux exits each respective permanent magnet. That is (although not shown), after exiting each of the permanent magnets 66 and 76, the flux then loops back inwardly through the respective teeth 70 and 80 between the respective permanent magnet and respective neighboring ones of the permanent magnets, and then further loops back in an outwardly-directed manner so as to re-enter the respective permanent magnet.

Given the manner in which magnetic flux passes out of, around, and into the various ones of the permanent magnets 66 and 76, it should be recognized that (as noted above) the magnetic flux of the permanent magnets 66 and the magnetic flux of the permanent magnets 76 is aligned for those ones of the permanent magnets that are at or near a first region 84 of minimum airgap (e.g., near the top of the stator 52 as shown in FIGS. 1B and 1C). However, the magnetic flux of the permanent magnets 66 and the magnetic flux of the permanent magnets 76 is out of alignment for those ones of the permanent magnets that are at or near a second region 86 of maximum airgap (e.g., near the bottom of the stator 52 as shown in FIGS. 1B and 1C). Thus, poles at the minimum airgap will attract each other and the poles at the maximum airgap will repel one another, albeit at a lower force due to the larger air gap.

Referring additionally to FIG. 1D, it will be appreciated that in this circumstance the rotor 54 has a slightly different position relative to the stator 52 than is illustrated by FIGS. 1B and 1C. More particularly, it can be seen that the rotor 54 has a rotational position that is rotated slightly in a clockwise manner, in a direction indicated by an arrow 90, relative to the stator 52, by comparison with the rotational position of the rotor 54 relative to the stator 52 shown in FIGS. 1B and 1C. Such rotational positioning of the rotor 54 relative to the stator 52 can occur particularly if the magnetic cycloidal gear assembly 50—and the rotor 54, due to force/torque applied via the output structure of the gear assembly, which is not shown—is under load.

FIG. 1D particularly also shows arrows 92 that illustrate example magnetic forces that are experienced between respective ones of the permanent magnets 76 of the rotor 54 and nearby respective ones of the permanent magnets 66 of the stator 52 when the rotor 54 and the stator 52 are positioned relative to one another in the manner shown. The arrows 92 illustrate how, due to the permanent magnets 66 on the stator 52 being larger in number than the permanent magnets 76 on the rotor 54 (due to there being a larger number of the pole pairs 56 on the stator 52 than on the rotor 54), different pairs of proximate ones of the permanent magnets 66 and permanent magnets 76 experience magnetic forces that are oppositely-directed in terms of whether those forces tend to cause torquing of the rotor 54 relative to the stator 52 in a rotational direction corresponding to or counter to that of the arrow 90. It should be appreciated that, although the arrows 92 illustrate magnetic forces that are the strongest (or primary) magnetic forces in that those forces are experienced between each respective one of the permanent magnets 76 and the respective one(s) of the permanent magnets 66 that are closest to one another, there are also less strong (or secondary) magnetic forces (not represented by the arrows 92) that can be experienced between various pairs of the magnets 76 and 66 that are not closest to one another.

More particularly, it can be seen from FIG. 1D that the arrows 92 linking any of first ones 94 of the permanent magnets 76 of the rotor 54 to closest neighboring ones of the permanent magnets 66 of the stator 52 have directions with a component tending to be rotationally aligned with the rotational direction of the arrow 90. This is because the closest neighboring ones of the permanent magnets 66 of the stator 52 relative to each of those first ones 94 of the permanent magnets 76 happen to be positioned clockwise relative to the respective positions of those permanent magnets 76. In contrast, the arrows 92 linking any of second ones 96 of the permanent magnets 76 of the rotor 54 to closest neighboring ones of the permanent magnets 66 of the stator 52 have directions with a component tending to be opposed to the rotational direction of the arrow 90. This is because the closest neighboring ones of the permanent magnets 66 of the stator 52 relative to each of those second ones 96 of the permanent magnets 76 happen to be positioned counter-clockwise relative to the respective positions of those permanent magnets 76. It will be further appreciated that, in some cases, it is possible that a given one of the permanent magnets 76 of the rotor 54 will be positioned equally closely to each of a pair of the permanent magnets 66 of the stator 52 (or vice-versa). In such a case, as represented for example by a bidirectional arrow 88 (pair of arrows) linking a further one 98 of the permanent magnets 76 of the rotor 54 with two of the permanent magnets 66 of the stator, the forces imposed upon the rotor 54 will equally tend to cause torquing of the rotor 54 in a direction aligned with, or opposed to, the rotational direction of the arrow 90.

The arrows 92 of FIG. 1D illustrate how the magnetic forces occurring between different pairs of the permanent magnets 66 and 76 of the stator 52 and rotor 54 can diminish the torque carrying capacity of the magnetic cycloidal gear assembly 50 and the rotor 54 thereof. Indeed, it should be recognized that it is primarily the torque arising from the forces between the second ones 96 of the permanent magnets 76 and those of the permanent magnets 66 closest thereto that can be delivered to a load by the conventional magnetic cycloidal gear assembly 50 (or the rotor 54 thereof). In contrast, the torque arising from the forces between the first ones 94 of the permanent magnets 76 and those of the permanent magnets 66 closest thereto tend to counteract and diminish that deliverable torque. (Also, with respect to the forces occurring between two of the stator permanent magnets 66 and a single one of the rotor permanent magnets 76 that is equally close to those two stator permanent magnets, or vice-versa, such as the forces described above involving the further one 98 of the permanent magnets 76, there is no significant impact upon deliverable torque by those forces.) In effect, the torque arising from the primary forces generated by the first ones 94 of the permanent magnets 76 serves to repel or counteract some of the torque arising from the primary forces generated by the second ones 96 of the permanent magnets 76, thus reducing overall torque carrying capacity of the magnetic cycloidal gear assembly 50 (and the rotor 54 thereof).

For at least one or more of these reasons, or one or more other reasons, it would be advantageous if new or improved magnetic cycloidal gear boxes, gear assemblies or systems could be developed, and/or improved methods of operation of such gearboxes, assemblies or systems could be developed, so as to address any one or more of the concerns discussed above or to address one or more other concerns or provide one or more benefits.

SUMMARY

In at least one example embodiment, the present disclosure relates to an electromagnetically-controlled magnetic cycloidal gear assembly. The magnetic cycloidal gear assembly includes a stator that is fixed and concentric with respect to a primary axis of the magnetic cycloidal gear assembly, and that includes a plurality of first magnetic devices, and also includes an input shaft that is configured to rotate about the primary axis and that includes an offset cam that is offset with respect to the primary axis. Additionally, the magnetic cycloidal gear assembly also includes a cycloid mounted at least indirectly upon the offset cam and configured to rotate both relative to the offset cam and also within the stator, where the cycloid is eccentric with respect to the primary axis and includes a plurality of second magnetic devices. Further, the magnetic cycloidal gear assembly additionally includes an output hub that is concentric with the primary axis and includes a plurality of cam follower receivers, and a plurality of cam followers, each cam follower having a respective first end and a respective second end, where the respective first end of each cam follower is received within a respective one of the cam follower receivers and the respective second end of each cam follower is coupled to the cycloid at a respective location on the cycloid. Additionally, either each of the first magnetic devices or each of the second magnetic devices includes a respective electromagnet configured to produce a respective magnetic field in accordance with a respective current passing therethrough.

Further, in at least one example embodiment, the present disclosure relates to an electromagnetically-controlled magnetic cycloidal gear assembly. The magnetic cycloidal gear assembly includes a stator that is fixed and concentric with respect to a primary axis of the magnetic cycloidal gear assembly, and that includes a plurality of first magnetic devices, where each of the first magnetic devices includes a respective electromagnet. Also, the magnetic cycloidal gear assembly includes an input shaft that is configured to rotate about the primary axis and that includes an offset cam that is offset with respect to the primary axis. Further, the magnetic cycloidal gear assembly additionally includes a cycloid mounted at least indirectly upon the offset cam and configured to rotate both relative to the offset cam and also within the stator, where the cycloid is eccentric with respect to the primary axis and includes a plurality of second magnetic devices, and where each of the second magnetic devices includes a respective permanent magnet. Additionally, the magnetic cycloidal gear assembly also includes an output hub that is concentric with the primary axis and includes a plurality of cam follower receivers, where the output hub is at least indirectly rotationally coupled to the cycloid by way of a plurality of cam followers that are coupled to the cycloid and that respectively interface the cam follower receivers. Further, the magnetic cycloidal gear assembly additionally includes a controller coupled to each of the electromagnets by way of one or more linkages, where the controller is configured to govern at least one electric current that is passed through at least one of the electromagnets so as to produce a magnetic field.

Additionally, in at least one example embodiment, the present disclosure relates to a method of operating a electromagnetically-controlled magnetic cycloidal gear assembly. The method includes providing a stator that is fixed and concentric with respect to a primary axis of the magnetic cycloidal gear assembly, and that includes a plurality of first magnetic devices, where each of the first magnetic devices includes a respective electromagnet. Also, the method includes causing, at least indirectly by way of a controller, at least one current to flow through the respective electromagnets of the first magnetic devices so as to generate a magnetic field. Additionally, the method includes receiving input rotational power at an input shaft having an offset cam about the primary axis, where the offset cam is offset with respect to the primary axis. Further, the method includes, in response to the receiving of the input rotational power, eccentrically rotating a cycloid that is mounted at least indirectly upon the offset cam within the stator, where the cycloid is eccentric with respect to the primary axis and includes a plurality of second magnetic devices, and where each of the second magnetic devices includes a respective permanent magnet. The cycloid eccentrically rotates at least in part due to interactions between the first magnetic devices and the second magnetic devices. Additionally, the method also includes communicating at least one first portion of the input rotational power from the cycloid to an output hub that is concentric with the primary axis and includes a plurality of cam follower receivers, by way of a plurality of cam followers that are coupled to the cycloid and that interface the cam follower receivers, and outputting the at least one first portion of the input rotational power as output rotational power from the output hub.

Further, in at least one additional example embodiment, the present disclosure relates to an electromagnetically-controlled magnetic cycloidal gear assembly that is configured to achieve an enhanced torque capacity. The electromagnetically-controlled magnetic cycloidal gear assembly includes a stator, an input shaft, a cycloid, an output hub, and a controller. The stator is fixed and concentric with respect to a primary axis of the magnetic cycloidal gear assembly, and includes a plurality of electromagnets, and the input shaft is configured to rotate about the primary axis and includes an offset cam that is offset with respect to the primary axis. The cycloid is mounted at least indirectly upon the offset cam and configured to rotate both relative to the offset cam and also within the stator, where the cycloid is eccentric with respect to the primary axis and includes a plurality of permanent magnets, and the output hub is concentric with the primary axis and coupled at least indirectly to the cycloid so that output torque and speed can be at least indirectly communicated to the output hub from the cycloid. The controller is coupled at least indirectly to the electromagnets or coupled at least indirectly to a plurality of control devices that respectively are coupled to the electromagnets, respectively. At a first time, the controller operates (a) to generate at least one first output signal that is configured to cause each of a first subset of the electromagnets to produce a respective first magnetic flux with a first polarity, and (b) either to generate at least one second output signal that is configured to cause each of a second subset of the electromagnets to produce a respective second magnetic flux with a second polarity that is opposite to the first polarity or that is configured to cause each of the second subset of the electromagnets to be switched off, or to refrain from generating the at least one second output signal so that each of the second subset of the electromagnets is switched off.

Additionally, in at least one further example embodiment, the present disclosure relates to an electromagnetically-controlled magnetic cycloidal gear assembly that is configured to achieve an enhanced torque capacity. The electromagnetically-controlled magnetic cycloidal gear assembly includes an input shaft and an output shaft, where the input shaft includes an offset cam, a stator, and a cycloid. The stator is fixed and concentric with respect to a primary axis of the magnetic cycloidal gear assembly, and the cycloid is mounted at least indirectly upon the offset cam, configured to rotate both relative to the offset cam and also within the stator, and coupled at least indirectly to the cycloid so that output torque can be at least indirectly communicated to the output shaft. The electromagnetically-controlled magnetic cycloidal gear assembly also includes a plurality of electromagnets supported upon a first one of the stator and cycloid, and a plurality of permanent magnets supported upon a second one of the stator and cycloid. Further, the electromagnetically-controlled magnetic cycloidal gear assembly includes a controller coupled at least indirectly to the electromagnets or coupled at least indirectly to a plurality of control devices that respectively are coupled to the electromagnets. The controller is configured to determine, at a plurality of times on a repeated or continual basis, respective torque characteristics concerning the respective electromagnets. The respective torque characteristic that is determined concerning each respective one of the electromagnets at a first one of the times is indicative of a respective relative position of the respective one of the electromagnets in relation to a respective closest one of the permanent magnets at or proximate to the first one of the times. Additionally, the controller is configured to output a plurality of output signals at the plurality of times for receipt, respectively, by respective ones of the electromagnets or respective ones of the switching devices, where the plurality of output signals control or influence respective actuation statuses of the respective electromagnets. Also, the output signals that are output by the controller at or proximate to the first one of the times are generated based at least in part upon the respective torque characteristics determined at the first one of the times, and are configured to cause a first subset of the electromagnets to produce respective first magnetic fluxes having a first polarity, and to cause a second subset of the electromagnets to either be deactivated or to produce respective second magnetic fluxes having a second polarity.

Further, in at least one additional example embodiment, the present disclosure relates to a method of operating an electromagnetically-controlled magnetic cycloidal gear assembly to achieve an enhanced torque capacity. The method includes sensing a position of a cycloid relative to a stator, where the stator is concentric with respect to a primary axis and includes a plurality of electromagnets, and where the cycloid is mounted at least indirectly upon an offset cam of an input shaft, is configured to rotate both relative to the offset cam and also within the stator, and includes a plurality of permanent magnets. The method also includes determining at a first time respective torque characteristics concerning the respective electromagnets based at least in part upon the sensed position, where the respective torque characteristic that is determined concerning each respective one of the electromagnets at the first time is indicative of a respective relative position of the respective one of the electromagnets in relation to a respective closest one of the permanent magnets. The method additionally includes outputting from a controller, for receipt respectively at least indirectly by the respective electromagnets or respective control devices coupled to the respective electromagnets, a plurality of output signals, where the plurality of output signals are respectively based at least in part upon the respective torque characteristics, and where the plurality of output signals at least indirectly control or influence whether the respective electromagnets are energized or not energized, or control or influence whether respective currents conducted by the respective electromagnets when energized have a positive polarity or a negative polarity, respectively. The plurality of output signals includes one or more first output signals that is or are output for receipt by a first subset of the electromagnets or by a first subset of the respective control devices coupled to the electromagnets of the first subset, where the one or more first output signals are configured to cause the electromagnets of the first subset to be energized and to cause the respective currents conducted by the respective electromagnets of the first subset to have a positive polarity. Further, either (a) the electromagnets of a second subset of the electromagnets are not energized when the electromagnets of the first subset are energized, or (b) the plurality of output signals includes one or more second output signals that is or are output for receipt by the second subset of the electromagnets or by a second subset of the respective control devices, where the one or more second output signals are configured to cause the electromagnets of the second subset to be energized and to cause the respective currents conducted by the respective electromagnets of the second subset to have a negative polarity.

Notwithstanding the above examples, the present invention is intended to encompass a variety of other embodiments including for example other embodiments as are described in further detail below as well as other embodiments that are within the scope of the claims set forth herein.

BRIEF DESCRIPTION OF THE DRAWINGS

Embodiments of the disclosure are disclosed with reference to the accompanying drawings and are for illustrative purposes only. The disclosure is not limited in its application to the details of assembly or arrangements of components, or orderings of process steps, illustrated in the drawings. The disclosure is capable of other embodiments or of being practiced or carried out in other various manners. In the drawings, like parts are labeled with like reference numbers. In the drawings:

FIG. 7 is a perspective view of a housing for a magnetic cycloidal gear assembly of the present technology such as that described in regard to FIGS. 2, 3, 4, 5, and 6;

FIG. 8 is a flow chart illustrating example steps of one example method of operation of the magnetic cycloidal gear assembly of FIGS. 2, 3, 4, 5, and 6;

FIG. 11 is a front elevation view of portions of the magnetic cycloidal gear assembly of FIGS. 2, 3, 4, 5, and 6 (but not including an output hub, a bushing, or a plurality of cam followers thereof), in which the portions shown in FIG. 11 have the same first rotational positions as those portions are shown to have in FIGS. 4 and 5, and which (in contrast to FIG. 9) figuratively illustrates directions of example magnetic flux associated with electromagnets of the gear assembly when some of the electromagnets are actuated with a normal polarity but some others of the electromagnets are actuated with a reversed polarity;

FIG. 12 is a front elevation view of the same portions of the magnetic cycloidal gear assembly of FIGS. 2, 3, 4, 5, 6, and 11 that are particularly shown in FIG. 11, in which the cycloid of the gear assembly is shown to have a slightly different position than what is shown in FIG. 11 due to the gear assembly being under load, and which figuratively illustrates directions of example forces experienced by those of the electromagnets which are actuated either with the normal polarity or the reversed polarity when the gear assembly is under load;

FIG. 13 is a flow chart illustrating example steps of one further example method of operation of the magnetic cycloidal gear assembly of FIGS. 2, 3, 4, 5, and 6 consistent with what is shown in FIGS. 9 and 10, in which some electromagnets of the gear assembly are actuated but other electromagnets are not actuated; and FIG. 14 is a flow chart illustrating example steps of one additional example method of operation of the magnetic cycloidal gear assembly of FIGS. 2, 3, 4, 5, and 6 consistent with what is shown in FIGS. 11 and 12, in which some electromagnets of the gear assembly are actuated with the normal polarity but some others of the electromagnets are actuated with the reversed polarity.

DETAILED DESCRIPTION

Figure 1A:
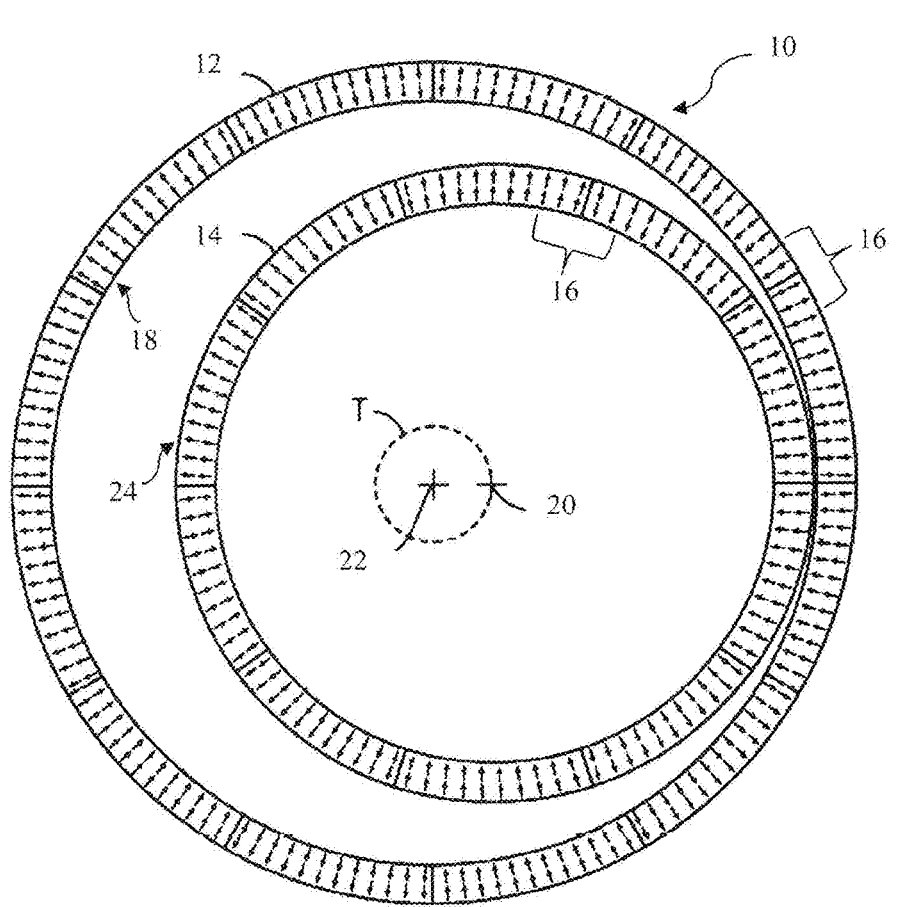
FIG. 1A is a Prior Art schematic, front elevation view of a conventional magnetic cycloid gear as can be employed in a conventional magnetic cycloidal gear assembly.

The present disclosure relates to embodiments of magnetic cycloidal (or cycloid) gear assemblies or systems, which can also be referred to as magnetic gearboxes, that employ electromagnets in place of at least some permanent magnets that might otherwise be employed in conventional magnetic gearboxes. In at least some such embodiments encompassed herein, the electromagnets are positioned on or as part of the stator in place of permanent magnets that conventionally might be employed on the stator. The electromagnets can be powered or unpowered as needed or depending upon the circumstance. Given this to be the case, the magnetic cycloid gear assembly or system operates as an electromagnetically-controlled (or powered) magnetic gearbox that both can operate as a conventional magnetic gearbox when powered, and also can "disengage" to allow freewheeling of the output when necessary.

In at least some embodiments encompassed herein, the magnetic cycloid gear assemblies or systems (or gearboxes) encompassed herein are configured to achieve enhanced torque capacity (e.g., by comparison with some conventional embodiments of magnetic cycloid gear assemblies, systems, or gearboxes). In at least some such embodiments in which electromagnets are employed (e.g., on the stator), improved torque capacity is achieved by switching on and off the electromagnets (e.g., switching on and off the magnets electromagnetically, or switching on and off the currents flowing through the electromagnets) depending on whether the particular electromagnets are acting to contribute positively or negatively to torque. Further, in at least some additional embodiments, the polarity of certain ones of the electromagnets or electromagnetic poles can be reversed to potentially increase the torque capacity even further. In general, by appropriate switching or polarity reversals of various ones of the electromagnets, magnetic attraction between negatively contributing pole pairs in the large air gap can be reduced or prevented, which in turn allows for greater torque to be communicated by way of the overall magnetic cycloid gear assembly or system (or gearbox).

Magnetic cycloidal gear assemblies as disclosed or encompassed herein can be used in a wide variety of applications. For example, in some embodiments, such magnetic cycloidal gear assemblies can be incorporated into servo actuators. In at least one example, servo actuators including such magnetic cycloidal gear assemblies of the present technology can be used for aerospace applications such as flight surface control applications. Further, magnetic cycloid gear assemblies of the present technology can be made with various gear ratios, and can have various rotations per minute, depending upon the application or desired level of power output. Although the present disclosure particularly envisions the application or implementation of electromagnets with respect to magnetic cycloidal gear assemblies or systems (or gearboxes), the present disclosure also encompasses embodiments in which electromagnets are applied to other topologies (e.g., other gearbox or transmission topologies) as well.

Figures 1D, 2:
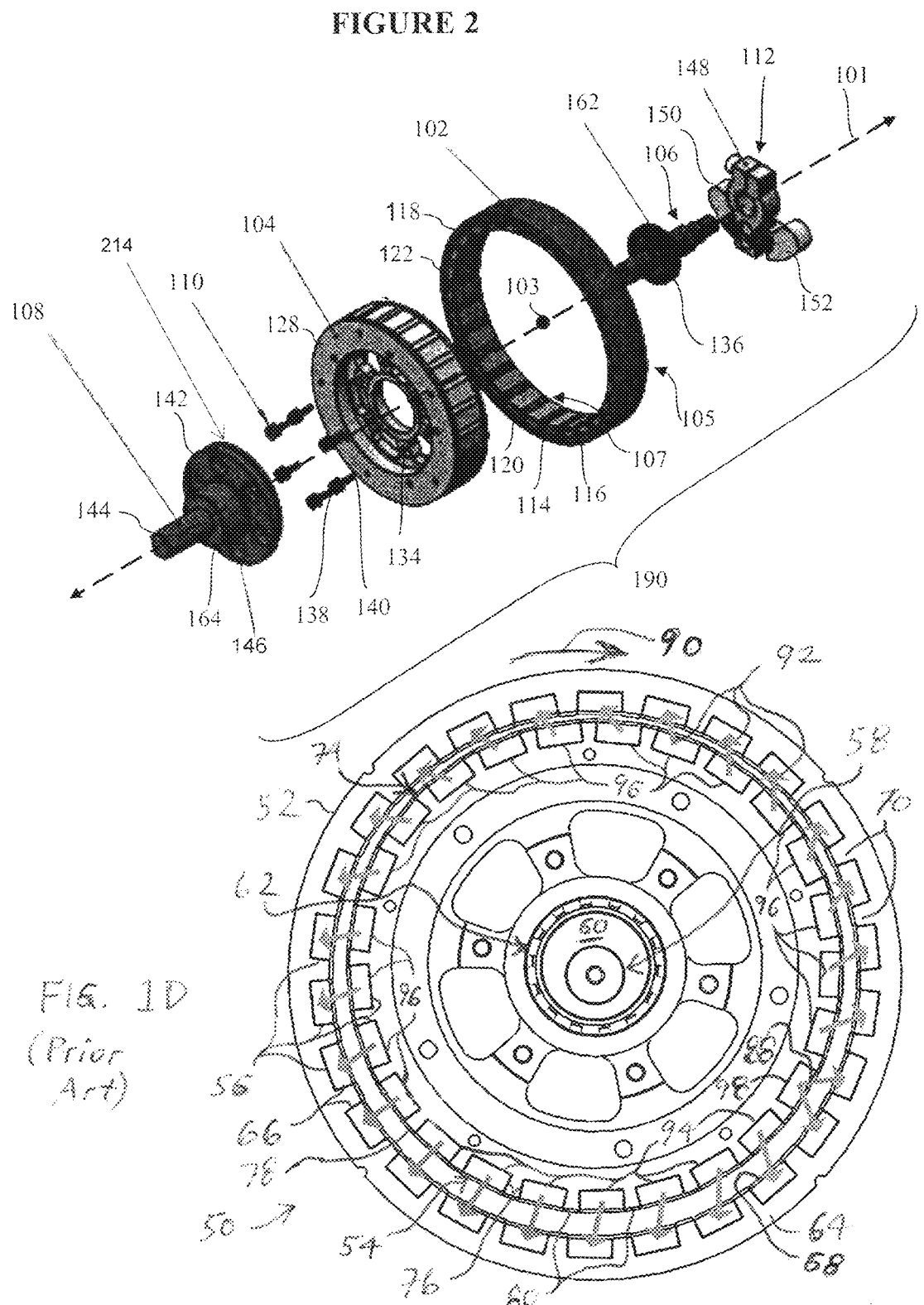
FIG. 1D is a Prior Art schematic, front elevation view of the portions of the conventional magnetic cycloid gear assembly of FIG. 1B, which figuratively illustrates directions of example forces experienced between the stator and rotor magnets of the gear assembly when under load.
FIG. 2 is an exploded view of portions of one example of a magnetic cycloidal gear assembly that employs electromagnets in accordance with the present technology.
Figure 3:
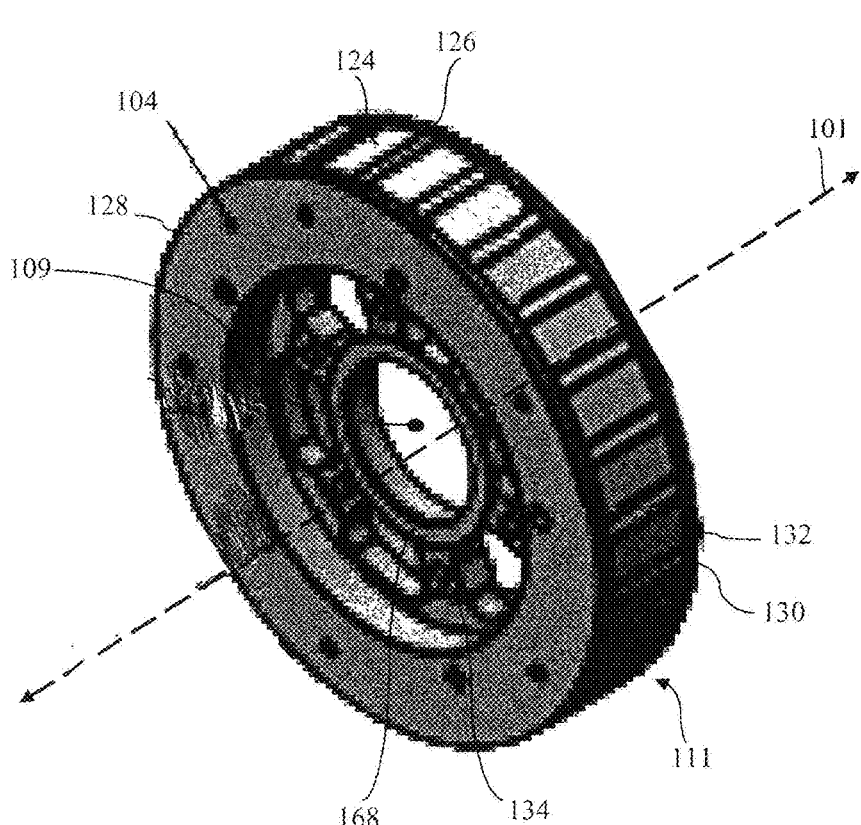
FIG. 3 is an enlarged view of one of the portions shown in FIG. 2, namely, a cycloid.
Figure 4:
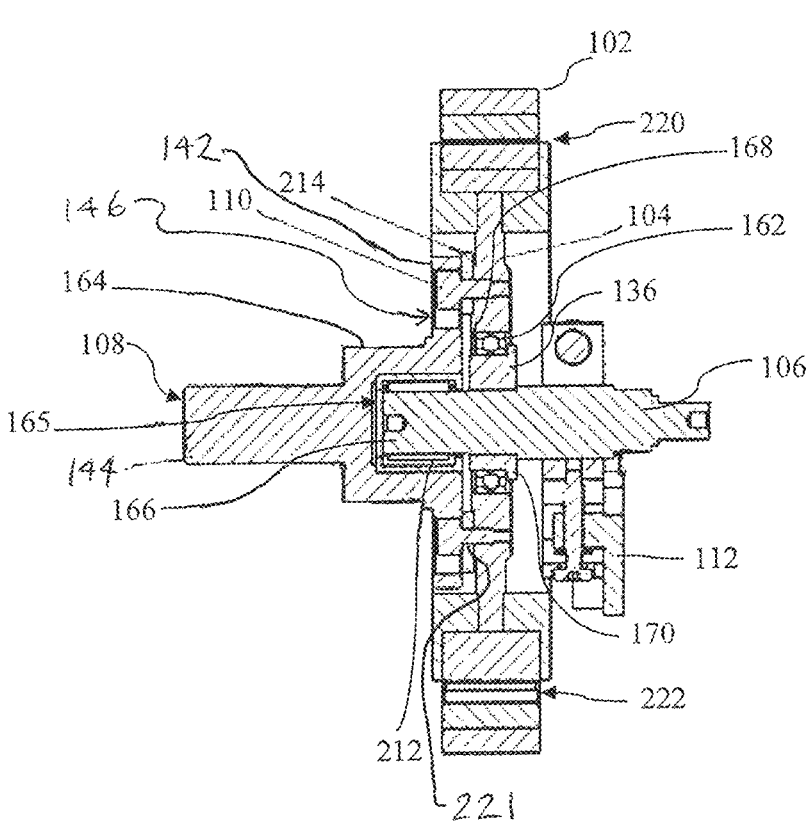
FIG. 4 is a cross-sectional view of the portions of the magnetic cycloidal gear assembly shown in FIGS. 2 and 3, when the portions of the magnetic cycloidal gear assembly are fully assembled (rather than exploded) and have first rotational positions about a central axis corresponding to the positions shown in FIG. 2.

One example of a magnetic cycloidal gear assembly 100 that includes electromagnets in accordance with the present technology is shown in FIGS. 2, 3, 4, 5, and 6. The magnetic cycloidal gear assembly 100 is shown, in its entirety, in FIGS. 5 and 6, which (among other aspects) illustrate schematically a controller 250 that serves to govern the providing of power to the electromagnets of the magnetic cycloidal gear assembly, along with associated power/control linkages 252. By contrast, FIGS. 2 and 4 show portions 190 of the magnetic cycloidal gear assembly 100 that omit the controller 250 and associated power/control linkages 252, and FIG. 3 particularly shows a cycloid 104 of that gear assembly. FIG. 4 particularly provides a cross-sectional view of the portions 190 of the magnetic cycloidal gear assembly 100 when those portions are fully assembled. The particular cross-sectional view provided in FIG. 4 is taken along a plane that passes through a schematic primary axis 101 of the magnetic cycloidal gear assembly 100.

As shown in FIGS. 2 and 4, the magnetic cycloidal gear assembly 100 includes a stator 102, a cycloid 104, an input shaft 106, an output hub 108, a bushing 214, a plurality of cam followers 110, and a counterweight 112. The stator 102 is fixed and concentric with respect to the schematic primary axis 101 of the magnetic cycloidal gear assembly 100, such that the schematic primary axis 101 intersects a center point 103 of the stator 102 when the magnetic cycloidal gear assembly 100 is assembled and mounted. The stator 102 is generally annular in shape and has an outer cylindrical surface 105 and an inner cylindrical surface 107. In the present example, the stator 102 includes a back-iron cylinder 118 having an outer rim that constitute the outer cylindrical surface 105, and additionally a plurality of teeth (e.g., m teeth) 120 that each protrude radially inwardly from the back-iron cylinder towards the center point 103 of the stator 102.

The stator 102 also has a number of (e.g., m) electromagnets 122, with each of the electromagnets being mounted between a respective pair of the teeth 120 and facing inwardly towards the center point 103 of the stator 102. Innermost surfaces of the teeth 120 and of the electromagnets 122 together form the inner cylindrical surface 107 of the stator 102. Each of the electromagnets 122 has a respective inner surface along the inner cylindrical surface 107 and can be powered so that the respective inner surface constitutes a respective positive pole 114. When the electromagnets 122 are powered to provide the positive poles 114 (along the inner surfaces of those electromagnets), then each of the teeth 120 is a respective negative pole 116. In this regard, the respective teeth 120 also can be considered respective consequent poles by comparison with the positive poles 114 provided by the respective electromagnets 122.

With such arrangement, the stator 102 can be understood to include a first number of electromagnetically-generated pole pairs, such as m (or alternatively m+1) magnetic pole pairs, with each magnetic pole pair having a respective one of the positive poles 114 and a respective one of the negative poles 116. Although in this arrangement, it is particularly the positive poles 114 that are provided by the electromagnets (or windings or coils) 122, with the negative poles 116 being provided by way of the teeth 120 as consequent poles, this need not be the case in other embodiments. In particular, in some alternate embodiments, electromagnets (or windings or coils) are employed for both the positive and negative poles—that is, certain ones of the electromagnets (or windings or coils) serve as the positive poles while other ones of the electromagnets (or windings or coils) serve as the negative poles.

Referring additionally to FIG. 3, the cycloid 104 serves as a rotor that is configured to rotate within the stator 102 during operation of the magnetic cycloidal gear assembly 100. The cycloid 104 is mounted eccentrically with respect to the schematic primary axis 101 of the magnetic cycloidal gear assembly 100, such that the schematic primary axis 101 does not intersect a center point (or center axis) 109 of the cycloid 104 when the magnetic cycloidal gear assembly 100 is assembled and mounted. The cycloid 104 can be mounted onto the input shaft 106 by a rolling element bearing 162 on an offset cam 136 (see FIGS. 2 and 4). The rolling element bearing 162 can be, in an example embodiment, a radial bearing. An outer cylindrical surface 111 of the cycloid 104 particularly is the surface that effectively rolls around the inner cylindrical surface 107 of the stator 102 (except insofar as an air gap separates the two surfaces) when the cycloid rotates during operation of the magnetic cycloidal gear assembly 100.

Further as shown in FIG. 3, the cycloid 104 has a second number of magnetic pole pairs, such as n (or alternatively m) magnetic pole pairs, with each magnetic pole pair having a respective negative pole 124 and a respective positive pole 126. Because the cycloid 104 is configured to fit and rotate within the stator 102 during operation as the rotor of the magnetic cycloidal gear assembly 100, the number of magnetic pole pairs n of the cycloid is less than the number of magnetic pole pairs m of the stator 102. Depending upon the embodiment, the number of magnetic pole pairs n of the cycloid 104 can be less than the number of magnetic pole pairs m of the stator 102 by at least one magnetic pole pair, or by more than one magnetic pole pair.

In the present example embodiment, the cycloid 104 includes a back-iron cylinder (or disk) 128 having a plurality of (e.g., n) teeth 130, and additionally includes a number of (e.g., n) permanent magnets 132, with each of the permanent magnets being mounted between a respective pair of the teeth. The permanent magnets 132 of the cycloid 104 are arranged to each face outwardly away from the center point 109, and also each of the teeth 130 extends radially outwardly from the back-iron cylinder 128, so as to extend in between a respective pair of the permanent magnets 132. Given this arrangement, it can be seen that the outer cylindrical surface 111 of the cycloid 104 is formed by the radially-outermost surfaces of the permanent magnets 132 and teeth 130. The polarities of the teeth 130 and permanent magnets 132 are opposite those of the teeth 120 and electromagnets 122 of the stator 102 when the electromagnets are powered. That is, each of the permanent magnets 132 of the cycloid 104 is a respective one of the negative poles 124, and each of the teeth 130 is a respective one of the positive poles 126. The respective teeth 130 also can be considered respective consequent poles by comparison with the respective permanent magnets 132.

Notwithstanding the above discussion, the stator 102 in other embodiments can have any other suitable arrangement that provides magnetic pole pairs. For example, a Halbach array or series of Halbach arrays can be used in place of the back-iron of the stator 102. Also, the electromagnets 122 on the stator 102 can be arranged to serve as negative poles (in terms of the polarity of the electromagnets along the inner cylindrical surface 107), and the teeth 120 in between those permanent magnets can serve as positive poles. Likewise, in other embodiments the cycloid 104 (or rotor) can have any other suitable arrangement that provides magnetic pole pairs. Again for example, a Halbach array or series of Halbach arrays can be used in place of the back-iron of the cycloid 104. Additionally, the permanent magnets 132 on the cycloid can be arranged to serve as positive poles (in terms of the polarity of the permanent magnets along the outer cylindrical surface 111), and the teeth 130 can serve as negative poles. Also, different permanent magnets can be employed both to serve as positive poles and also to serve as negative poles on the cycloid.

Further, although in the present embodiment it is the stator 102 that includes the electromagnets 122 and the cycloid 104 that includes the permanent magnets 132, in alternate embodiments encompassed herein it is the cycloid that includes electromagnets and the stator that includes permanent magnets. Additionally, in some further alternate embodiments, each of the stator and the cycloid includes electromagnets. In some such embodiments, the electromagnets of the stator can have one polarity (e.g., a positive polarity, or alternatively a negative polarity) and the electromagnets of the cycloid can have the opposite polarity (e.g., a negative polarity, or alternatively a positive polarity). Also, in some alternate embodiments, one or both of the stator and the cycloid include a combination of one or more electromagnets and one or more permanent magnets.

Further, as discussed in additional detail below, in at least some embodiments encompassed herein, different ones of the electromagnets can be actuated differently and/or the actuation status of the respective electromagnets can be varied over time. For example, in some embodiments encompassed herein, certain electromagnets are actuated when other electromagnets are disabled, or certain electromagnets are actuated with a first (e.g., normal) polarity when other electromagnets are actuated with a second (e.g., reversed) polarity. In some such embodiments, the actuation statuses of the different electromagnets of the magnetic cycloidal gear assembly respectively are changed as time goes by during operation of the gear assembly, particularly as the cycloid 104 moves relative to (e.g., rolls within) the stator 102 in response to rotation of the input shaft 106 and/or in response to other forces/torques such as torques communicated to the cycloid 104 from a load (e.g., by way of output components such as the output hub 108, the bushing 214, and the plurality of cam followers 110).

In the present embodiment, the cycloid 104 is caused to rotate as a result of rotation of the input shaft 106. As shown in FIG. 2, the input shaft 106 includes the offset cam 136, which is positioned within and supports the cycloid 104 by way of the rolling element bearing 162. In general, the input shaft 106 is concentric with respect to the schematic primary axis 101 of the magnetic cycloidal gear assembly 100. However, the offset cam 136 is offset with respect to the schematic primary axis 101 of the magnetic cycloidal gear assembly 100, with one side of the offset cam 136 extending outwardly from the input shaft 106 farther than the other side of the offset cam. In the present example embodiment, in which the offset cam 136 is circular, the offset cam 136 is concentric with the cycloid 104.

As shown in FIG. 4, the cycloid 104 can include a cycloid lip (or shoulder) 168, and can be mounted on the rolling element bearing 162 in part by way of the cycloid lip 168. As illustrated, the cycloid lip particularly extends radially inwardly along a side portion of the rolling element bearing 162, along the side of the rolling element bearing that is closer to (rather than farther from) the output hub 108. Further, the offset cam 136 includes an offset cam shoulder 170 that extends radially outward from the remainder of the offset cam alongside the rolling element bearing 162, on the side of the rolling element bearing that is farther from (rather than closer to) the output hub 108.

In addition to being caused to rotate as a result of rotation of the input shaft 106, the cycloid 104 and magnetic cycloidal gear assembly 100 more generally are configured so that rotation of the cycloid additionally causes rotation of the output hub 108. In this regard, the cycloid 104 includes a plurality of cam follower retainers 134, each of which is configured to receive a respective one of the cam followers 110. Each of the plurality of cam followers 110 has a first end 138 and a second end 140. The second end 140 of each of the plurality of cam followers 110 is retained by a respective one of the cam follower retainers 134, and is thus fixed to the cycloid 104. Further, the output hub 108 presses against the bushing 214, which can be an oil impregnated bushing, and the bushing can also press against the cycloid 104. The bushing 214 can include a plurality of bores 221 (see FIG. 4), and each of the plurality of cam followers 110 can pass through a respective one of the bores 221. The plurality of cam followers 110 can thus connect the bushing 214 to the cycloid 104.

It should be appreciated that the exact arrangement of the bushing 214, cam followers 110, and cam follower retainers 134 can vary depending upon the embodiment. For example, any suitable number of the cam follower retainers 134 and any suitable number of the bores 221 can be included, preferably at least two of each, or more than two of each, such as three, four, five, or more than five. For example, in the present embodiment, six of the cam follower retainers 134 and six of the bores 221 are present in the cycloid 104 and the bushing 214, respectively. Likewise, any suitable number of the cam followers 110 can be included in the magnetic cycloidal gear assembly 100. Accordingly, at least two of the cam followers 110 can be provided, or more than two, such as three, four, five, or more than five. For example, in the present embodiment, six of the cam followers 110 are present. Preferably a respective one of the cam followers 110 is provided for each of cam follower retainers 134 of the cycloid 104.

The cam followers 110 particularly allow for rotational motion of the cycloid 104 to be communicated to the output hub 108, which is concentric with the schematic primary axis 101 of the magnetic cycloidal gear assembly 100. The output hub 108 includes an output disk 142, an output shaft 144, and an intermediate portion 164 positioned between the output shaft and output disk and having a diameter that is larger than that of the output shaft. The output shaft 144 is concentric with the schematic primary axis 101, can be connected to another device, and can be used to transmit the speed and torque output (or generated) by the magnetic cycloidal gear assembly 100 to another device (not shown). The output disk 142 includes a plurality of cam follower receivers 146. Each of the cam follower receivers 146 has a receiver radius (or diameter) that is larger than a first end radius (or diameter) of each of the first ends 138 of each of the cam followers 110. By virtue of this difference in size of the receiver radius and first end radius, the respective first end 138 of each of the cam followers 110 can rotate eccentrically within the respective one of the cam follower receivers 146 in which that first end is positioned, even though the output hub 108 and cam follower receivers 146 thereof do not vary in their radial positioning relative to the schematic primary axis 101.

From the above discussion, it should be appreciated that the output hub 108 is interactively connected to the cycloid 104 by the cam followers 110, and the cam followers 110 transmit output torque and rotation from the cycloid 104 to the output hub. That is, as the cycloid 104 rotates relative to the stator 102, rotational power is transferred from the cycloid 104 to the output hub 108 by way of the plurality of cam followers 110 and their interactions with the cam follower receivers 146. The use of the plurality of cam followers 110 can eliminate the need for rolling pin elements, and can significantly reduce the rolling resistance and therefore improve the efficiency of the magnetic cycloidal gear assembly 100 as compared to some conventional magnetic cycloidal gear assemblies. Additionally, oil (or other lubricant) can be delivered to the bores 221, and thereby to the cam followers 110, the cam follower receivers 146, and the interface between output hub 108 and the bushing 218 to facilitate relative movement of these component parts (and especially any sliding movement of the bushing relative to the output hub).

In some embodiments, also encompassed herein, each of the cam followers 110 can include a respective roller bearing (or similar rolling head or wheel feature) at the respective first end 138 of the respective cam follower, as a respective head of the respective cam follower. With such an arrangement, movement of the cam followers 110 within the cam follower receivers 146 entails rotational motion of the roller bearings relative to the remaining portions of the cam followers (e.g., the second ends 140), and sliding motion (and consequent friction) of the cam followers relative to the cam follower receivers is lessened or avoided. Also, in some embodiments encompassed herein, a set of rolling element bearings that are fixed to the cycloid 104 operate to transmit torque from the cycloid to the output hub 108.

FIG. 4 additionally illustrates how the input shaft 106 and output hub 108 are supported relative to one another. In the present embodiment, an input shaft receiver 165 (which defines an input shaft receiving orifice) is provided within the output hub 108 and particularly extends inwardly from the end surface of the output disk 142 and into the intermediate portion 164, toward (but not up to) the output shaft 144. The input shaft receiver 165 is configured to receive a first end 166 of the input shaft 106 as well as an input shaft bearing 212. More particularly, the input shaft bearing 212 can be inserted into the input shaft receiver 165, and the first end 166 of the input shaft 106 can be inserted into the input shaft bearing. The input shaft bearing 212 can be a roller bearing, and can prevent radial movement of the input shaft 106 while allowing the input shaft 106 to rotate within the input shaft receiver 165. Therefore, the input shaft 106 (at least the first end 166 of the input shaft) is rotatably supported upon and within the output hub 108 by way of the input shaft bearing 212.

As for the counterweight 112, as shown in FIGS. 2 and 4, the counterweight is attached to the input shaft 106. The counterweight 112 can have a clamp 148, a first lobe 150 and a second lobe 152. The clamp 148 can attach the counterweight 112 to the input shaft 106 such that the counterweight 112 can rotate with the input shaft 106. The counterweight 112 can balance out the mass imbalance caused by the rotation of the eccentrically mounted cycloid 104.

Figure 5:
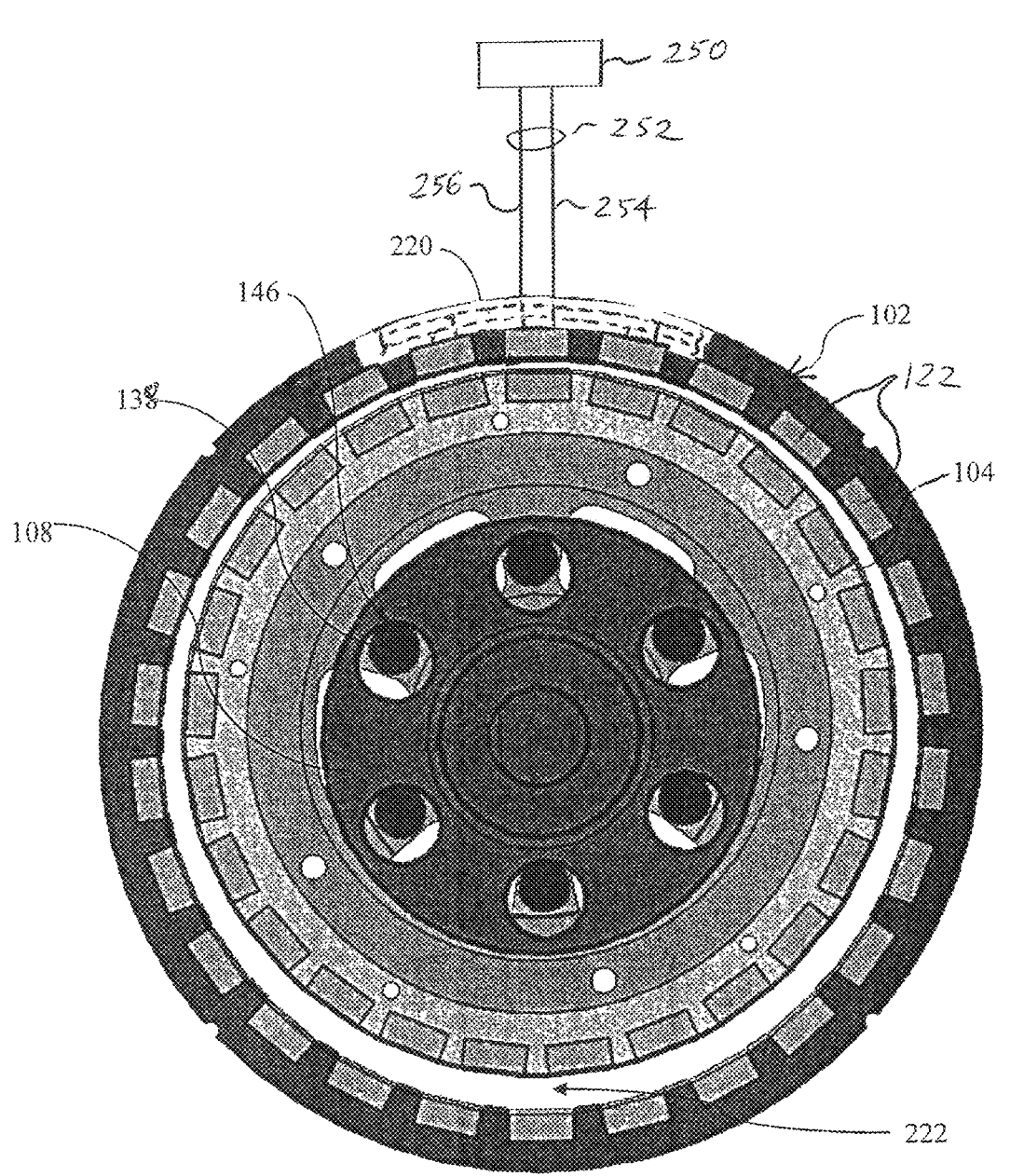
FIG. 5 is a front elevation view of the magnetic cycloidal gear assembly of FIGS. 2, 3, and 4, in which the portions shown in FIGS. 2 and 4 have the same first rotational positions as in FIG. 4, and which also shows schematically a controller for governing actuation of the electromagnets of the assembly, along with associated power/control linkages.
Figure 6:
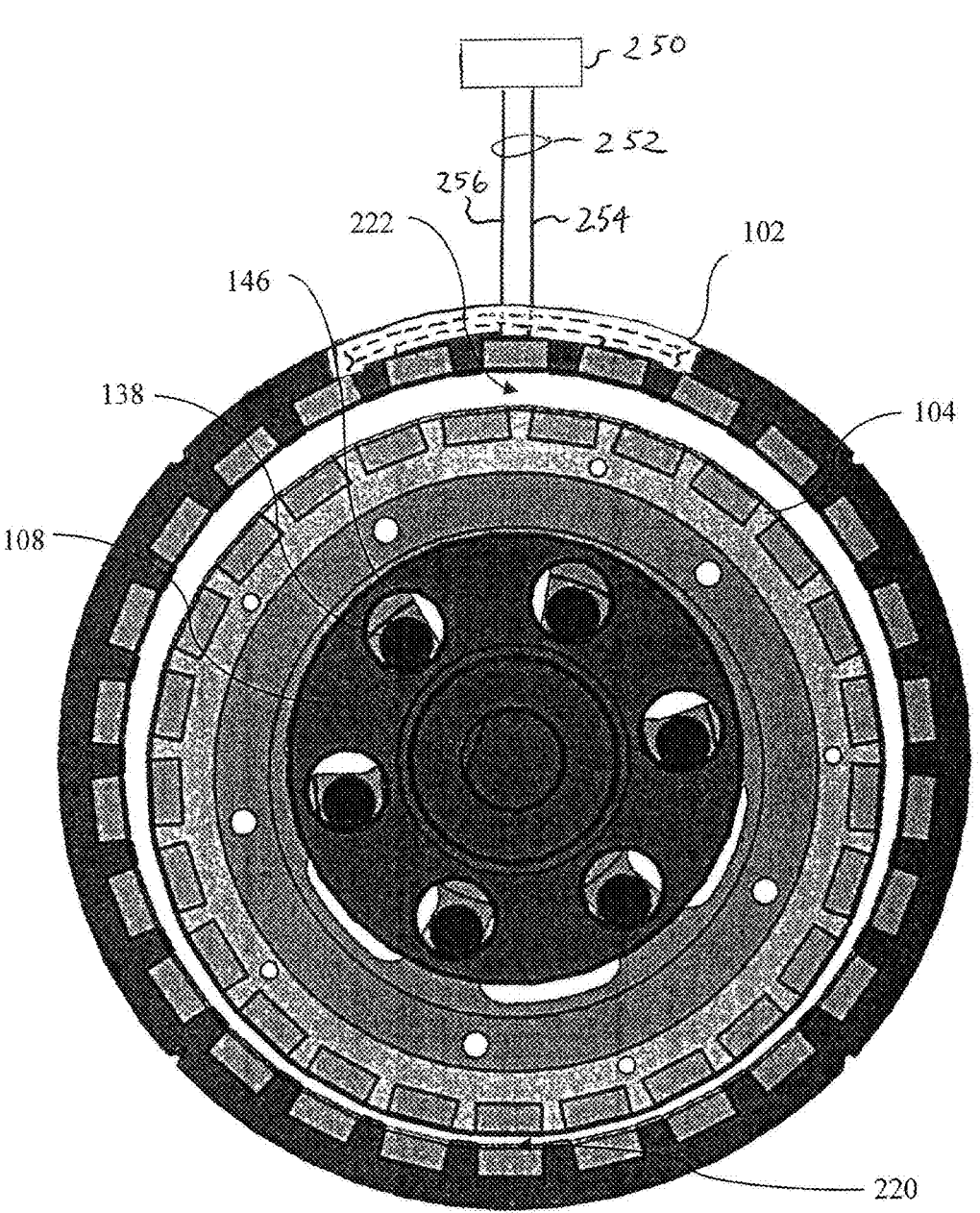
FIG. 6 is a front elevation view of the magnetic cycloidal gear assembly of FIGS. 2, 3, 4, and 5, in which several of the portions shown in FIGS. 2 and 4 have second rotational positions differing from those of FIGS. 4 and 5, and which again shows the controller and associated power/control linkages of FIG. 5.

Referring additionally to FIGS. 5 and 6, front elevation views are provided to illustrate the magnetic cycloidal gear assembly 100 at different times during operation, at which the cycloid 104 has two different positions relative to the stator 102. FIG. 5 particularly provides a front elevation view of the magnetic cycloidal gear assembly 100 when the cycloid 104 is in a first position, which corresponds to what is shown in FIG. 4 (in terms of the rotational orientation of the cycloid 104 about the schematic primary axis 101). By contrast, FIG. 6 provides a front elevation view of the magnetic cycloidal gear assembly 100 when the cycloid 104 is in a different, second position. Thus, the relative rotation of the rotor (cycloid 104) and stator 102 of the magnetic cycloidal gear assembly 100 can be seen by comparing FIG. 5 with FIG. 6. Additionally it should be appreciated that FIGS. 5 and 6 also show corresponding different positions of other components or portions of the magnetic cycloidal gear assembly 100 that also vary in their positions when the cycloid varies in its rotational positioning.

As will be appreciated from the above discussion, movement of the cycloid 104 results from rotation of the input shaft 106 and offset cam 136, which causes different ones of the positive poles 114 and negative poles 116 of the stator 102 to come into proximity with different ones of the negative poles 124 and positive poles 126 of the cycloid 104. Due to the interactions between these pole pairs, slipping motion between the outer cylindrical surface 111 of the cycloid 104 and the inner cylindrical surface 107 of the stator 102 is prevented. Stated in another manner, the magnets in essence prevent "slippage" of the cycloid 104 (serving as the rotor) relative to the stator 102 and thus, due to the magnetic interaction between the pole pairs of the stator 102 and the pole pairs of the cycloid 104, the cycloid rotation couples to the input shaft rotation as the magnets continue to seek their state of lowest potential (relatedly, it can be said that the magnetic forces provide the torque reaction allowing for the gearbox to transmit torque from input to output, as the cycloid would otherwise just spin on its bearing).

Consequently, as governed by the interaction of the magnetic pole pairs on the cycloid 104 and stator 102, rotation of the input shaft 106 and offset cam 136 causes the outer cylindrical surface of the cycloid 104 to "roll along" the inner circular surface 107 of the stator 102 (with those surfaces only being separated by an air gap), in an eccentric manner. The first position of FIG. 5 (and FIG. 4) shows the magnetic cycloidal gear assembly 100 at the start of a 360° revolution of the input shaft 106 (and offset cam 136), when the position of the cycloid 104 is closest to the uppermost portion of the inner cylindrical surface 107 of the stator 102. By comparison, the second position of FIG. 6 is half way through the revolution of the input shaft 106, at 180° from the first position, when the position of the cycloid 104 is closest to the lowermost portion of the inner cylindrical surface 107 of the stator 102.

The particular gear ratio achieved between the input rotation experienced by the input shaft 106 and the output rotation experienced by the output hub 108 depends upon the relative numbers of magnetic pole pairs on the stator 102 and on the cycloid 104. If one assumes, as shown in FIGS. 5 and 6, that the cycloid 104 has one fewer magnetic pole pair than the stator 102, then for every full rotation of the input shaft 106, the cycloid 104 must rotate one full rotation plus and additional amount to make up the difference. Supposing for example that the stator 102 has m+1 pole pairs and the cycloid 104 has m pole pairs, for a point on the cycloid after one full rotation of the input shaft 106, the point will have moved to a position equivalent to $-1/m$ rotations, where the negative sign indicates that the rotation is in the opposite sense to the rotation of the input shaft.

Because the cycloid 104 is supported upon the offset cam 136 and rotates eccentrically within the stator 102, and given the magnetic interactions between the cycloid 104 and stator 102, the amount of air gap (or space) between the stator 102 and the cycloid 104 varies at any given point around the inner cylindrical surface 107 of the stator 102 as the cycloid 104 rotates. Nevertheless, there is always a minimum gap 220 between the stator 102 and the cycloid 104 at a first point and a maximum gap 222 at a second point, and the locations of those points rotate as the cycloid 104 rotates in response to rotation of the input shaft 106 and offset cam 136. The minimum gap 220 particularly always is in line with the high point of the offset cam 136.

For example, as can be seen with reference to FIG. 5 (and FIG. 4), when the cycloid 104 is in the first position, the minimum gap 220 between the stator 102 and the cycloid 104 is at the top (as illustrated in FIGS. 5 and 4) of the stator 102 and the cycloid 104, and then the maximum gap 222 is at the bottom of the stator 102 and the cycloid 104. In contrast, as can be seen with reference to FIG. 6, when the cycloid 104 in the second position, the minimum gap 220 between the stator 102 and the cycloid 104 is at the bottom (as illustrated in FIG. 6) of the stator 102 and the cycloid 104, while the maximum gap 222 is schematically at the top of the stator 102 and the cycloid 104.

FIGS. 5 and 6 additionally show how other components or portions of the magnetic cycloidal gear assembly 100 rotate or otherwise move in conjunction with rotation of the input shaft 106 and offset cam 136 and consequent movement of the cycloid 104. In particular, FIG. 5 shows that, when the cycloid 104 is in the first position, each of the first ends 138 of the respective cam followers 110 is at the respective top of the respective cam follower receiver 146 into which the respective first end is positioned. In contrast, FIG. 6 shows that, when the cycloid 104 is in the second position, each of the first ends 138 of the respective cam followers 110 is at the respective bottom of the respective cam follower receiver 146 into which the respective first end is positioned. Thus, the eccentric rotation of the cam followers 110 within the cam follower receivers 146 that accompanies the eccentric rotation of the cycloid 104 can be appreciated from FIGS. 5 and 6.

As noted above, FIGS. 5 and 6 show the entire magnetic cycloidal gear assembly 100 of the present embodiment and, more particularly, each of FIGS. 5 and 6 (in contrast to FIGS. 2 and 4) also shows schematically the controller 250 for governing actuation of the electromagnets 122 of the stator 102 of the magnetic cycloidal gear assembly 100, along with the associated power/control linkages 252. It should be appreciated that the controller 250 can take any of a variety of forms depending upon the particular embodiment or implementation. For example, the controller 250 can take the form of a microprocessor or computer, including a computerized device that operates in accordance with software. Also for example, the controller 250 can take the form a hardwired control device or a programmable logic device, or multiple such devices, or a drive.

Preferably, the controller 250 is able to output electric power (and particularly current) to the electromagnets 122 by way of the power/control linkages 252 that is sufficient to enable the electromagnets to generate sufficient magnetic fields to allow the magnetic cycloidal gear assembly 100 to transmit rotational power. Depending upon the embodiment, the controller 250 can operate independently or, alternatively, the controller 250 can operate at least partly based upon or in response to commands, control signals, or information received by way of wired or wireless communications from another device, source, or location, including for example a remote controller or from the cloud (not shown). Also, in at least some embodiments, the controller 250 operates directly or indirectly based upon or in response to operator input commands or signals, and/or based upon or in response to sensed information, including for example information regarding the speed or torque of the input shaft 106 or regarding the speed or torque of the output shaft 144 (or structure(s) coupled thereto).

With respect to the power/control linkages 252, the manner in which these are illustrated in FIGS. 5 and 6 is merely intended to be illustrative of the existence of connections between the controller 250 and the electromagnets 122 by which electric power (and particularly current) can be provided to the electromagnets so that magnetic fields are generated by the electromagnets. The exact number and type of structures that are employed as the power/control linkages 252 can vary depending upon the embodiment. In the present example, the power/control linkages 252 include a first linkage 254 and a second linkage 256. Each of the first and second linkages 254 and 256 extends from the controller 250 to the stator 102 and then, within (or alongside) the stator, is coupled to each of the electromagnets 252. (For simplicity of illustration, the portions of the first and second linkages 254 and 256 that are within the interior of or alongside the stator 102 are illustrated by dashed lines, with only some portions of the linkages connected to some of the electromagnets 122 being shown, and other portions being cutaway and not shown.)

It is intended that the present disclosure encompass any of a variety of embodiments or arrangements of power/control linkages 252 in addition to the power/control linkages illustrated in FIGS. 5 and 6. For example, although the manner in which the first and second linkages 254 and 256 are shown in FIGS. 5 and 6 can be understood as indicating that all of the electromagnets 252 are electrically coupled in parallel with one another between the first linkage 254 and the second linkage 256, it should be appreciated that all of the electromagnets can alternatively be coupled in series between the first linkage 254 and the second linkage 256.

Further, the manner in which the power/control linkages 252 are illustrated in FIGS. 5 and 6 is intended to be representative of a variety of different types of connections and configurations by which operations/actuations of the electromagnets 122 can be controlled, influenced, or governed by the controller, including connections or configurations by which different respective ones of the electromagnets can be individually actuated or deactivated (or disabled) in different respective manners. For example, each of the first linkage 254 and the second linkage 256 can be understood to represent a respective bus that includes a respective plurality of connections (e.g., wires or other links), where the respective connections of each respective bus are respectively connected between the controller 250 each of the respective electromagnets 122 (or to respective individualized switches associated with the respective electromagnets) so as to allow for individualized control/actuation of the respective electromagnets.

Given this embodiment, when electric power (particularly current) is directed from the controller 250 to the electromagnets 122 via the first linkage 254 (or alternatively the second linkage 256), that electric current is directed to and passes through the electromagnets and then returns via the second linkage 256 (or alternatively the first linkage 254). During such operation, all of the electromagnets 122 turn "on" in response to the current conducted therethrough, and all of the electromagnets are simultaneously activated in terms of producing magnetic fields. Correspondingly, when the controller 250 ceases to direct electric power (particularly current) through the first linkage 254 (or alternatively the second linkage 256), then all of the electromagnets 122 are turned "off" and simultaneously deactivated such that no magnetic fields are generated by the stator 102.

In the present embodiment, the controller 250 particularly is configured to cause electric power (and current) to pass through the electromagnets 122 during a normal mode of operation, but to cease directing electric power (and current) flow through the electromagnets during a clutch mode of operation, when clutch functionality is desired. During normal operation when it is desired that the magnetic cycloidal gear assembly 100 generate output rotation at the output hub 108 in response to input rotation of the input shaft 106 in accordance with the gear ratio established by the pole pairs of the stator 102 and cycloid 104, the controller 250 actuates the electromagnets 122 to prevent slippage between the cycloid and the stator as discussed above.

However, when the electromagnets 122 are disabled during the clutch mode of operation (or possibly under other special circumstances when normal operation is not desired), the electromagnets of the stator 102 and permanent magnets 132 of the cycloid 104 will no longer prevent slipping between the cycloid and stator, and the magnetic cycloidal gear assembly (or gearbox) 100 will be able to freewheel. Stated in another manner, the electromagnets 122 and permanent magnets 132 in this circumstance no longer provide a torque reaction, and any torque applied at the input or output will simply cause the rolling element bearing 162 to spin. In such circumstance, the freewheel torque (e.g., as provided at the output shaft 108) will be a function only of the drag caused by the rolling elements, the inertia of the cycloid 104, and any secondary electromagnetic effects caused between the magnets and the unenergized electromagnets 122 (or windings or coils).

Figure 7:
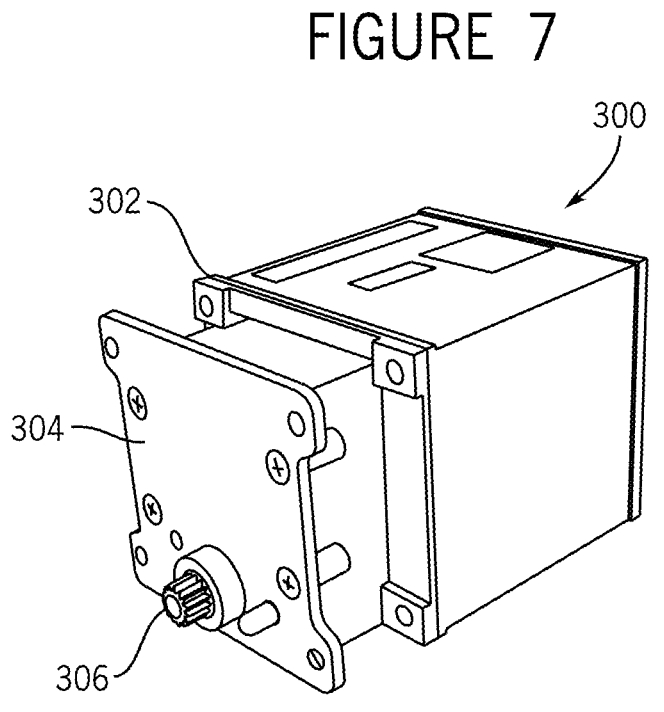

It should be recognized that magnetic cycloid gear assemblies of the present technology can be supported or implemented within any of a variety of types of structures depending upon the embodiment, and can be employed in any of a variety of applications. Referring to FIG. 7, in one example embodiment, the magnetic cycloidal gear assembly 100 can be contained within a housing 300. As shown, the housing 300 includes an outer shell 302 that encloses the magnetic cycloidal gear assembly 100. The housing 300 can also include a front cover 304, which can be a removable access panel that, when removed, provides access to the inside of the housing 300 and the magnetic cycloidal gear assembly 100. Additionally, the housing 300 can include one or more additional support and/or mounting structures to support, mount, or otherwise engage with the magnetic cycloidal gear assembly 100.

For example, as shown in FIG. 7, the housing 300 can include a connector 306, which engages and connects at a first end to the output shaft 144 of the output hub 108 and at a second end to another device to transfer rotational power from the magnetic cycloidal gear assembly 100 to the other device, which can be external to the housing. If the input shaft 106 is also driven by a rotational power source external to the housing, a further connector (not shown) can also be provided to couple the input shaft with that rotational power source. Also for example, internally within the housing 300, support and/or mounting structures (not shown) can be provided to support or mount the magnetic cycloidal gear assembly 100 within the housing 300.

It should be appreciated that, in at least some embodiments, the controller 250 and power/control linkages 252 can be positioned within the housing 300 but that, in other embodiments, the controller 250 and/or portions of the power/control linkages 252 can be located outside of the housing even though other portions (e.g., the portions 190 discussed above) are positioned within the housing 300. Also, it should further be appreciated that, although for purposes of the above discussion the magnetic cycloidal gear assembly 100 is considered to be distinct from (and situated within) the housing 300, and is considered to not include the housing or any of the support or mounting structures or components associated therewith, nevertheless the magnetic cycloidal gear assembly can also be understood to include the housing and/or any such support or mounting structures or components.

In view of the above discussion it should be appreciated that the magnetic cycloidal gear assembly 100 described in regard to FIGS. 2, 3, 4, 5, and 6 can be operated in several modes of operation by virtue of the controller 250 causing the electromagnets 122 to be powered or unpowered. Referring to FIG. 8, a flow chart 800 is provided to illustrate example steps of one example method of operation of the magnetic cycloidal gear assembly 100 in this regard. Notwithstanding what is shown in FIG. 8, however, it should be understood that the present disclosure is intended to encompass numerous other methods of operation and associated steps of operation for magnetic cycloidal gear assemblies such as the magnetic cycloidal gear assembly 100 or other assemblies or systems, and is not limited to the method shown in FIG. 8.

More particularly with respect to the method of operation illustrated by the flow chart 800, the method begins at a first step 802, at which a stator having magnetic devices including electromagnets is provided, such as the stator 102 with the electromagnets 122. The first step 802 can also be considered an initial step at which the entire structure of the magnetic cycloidal gear assembly 100 is provided or set up for operation. Next, at a second step 804, the controller 250 causes electric power (particularly current) to flow through the electromagnets 122 so as to generate magnetic fields. Further, at a third step 806, rotational power transmission operation of the magnetic cycloidal gear assembly 100 begins insofar as input rotational power is received at the input shaft 106 including the offset cam 136, such that the input shaft and offset cam can rotate.

Then, at a fourth step 808, the cycloid 104 is caused to eccentrically rotate within the stator 102 in response to the rotation of the offset cam 136, consistent with magnetic interactions between the permanent magnets 132 of the cycloid and the electromagnets 122 of the stator 102. Further, at a fifth step 810, at least one portion of the received input rotational power is communicated from the cycloid 104 to the output hub 108. In at least the present embodiment, the communication of this rotational power occurs due to interactions of the cam followers 110 with the cam follower receivers 146 of the output hub 108. Additionally, at a sixth step 812, the at least one portion of the input rotational power is output via the output hub (e.g., for receipt by a load or receiving device).

All of the steps 804, 806, 808, 810, and 812 can be considered to occur at a first time (or during a first time period) during which the magnetic cycloidal gear assembly 100 is operating in a normal mode of operation of the magnetic cycloidal gear assembly 100. During such normal operation, the magnetic cycloidal gear assembly 100 operates to transmit rotational power between the input shaft 106 and the output hub 108, with the rotational power being modified in terms of the rotational speed and torque in a manner consistent with the gear ratio of the magnetic cycloid gear assembly. However, as described above, in a clutch mode or other mode of operation of the magnetic cycloidal gear assembly, it can be desired that the output hub 108 be decoupled from the input shaft 106 so that the output hub experiences freewheeling.

In this regard, the method of FIG. 8 additionally includes a seventh step 814, at which the controller 250 ceases causing the electric power (and electric current) to be provided to the electromagnets 122 of the stator 102, such that the electric power (and current) ceases to flow through those electromagnets. Upon this occurring, then at an eighth step 816, the output hub 108 becomes rotationally decoupled from the input shaft 106 and freewheeling of the output hub is permitted. Although not shown in FIG. 8, it should be appreciated that the steps of the flow chart 800 can be repeated such that the magnetic cycloidal gear assembly 100 repeatedly switches between operation in the normal mode and operating in a mode where freewheeling is possible. For example, upon completion of the eighth step 816, the method can return to the step 804 at which electric power (and current) is again caused to flow through the electromagnets during a return to the normal mode of operation.

Turning now to FIGS. 9, 10, 11, and 12, the present disclosure additionally envisions embodiments and manners of operation in which different ones of the electromagnets 122 of the magnetic cycloidal gear assembly 100 are selectively actuated (or deactivated) in different respective manners so as to enable the magnetic cycloidal gear assembly 100 to deliver higher levels of torque to a load or to achieve higher torque capacity. Such selective actuation can involve, for example, switching on one or more of the electromagnets 122 while one or more others of the electromagnets are switched off, or causing one or more of the electromagnets 122 to be actuated with a first (e.g., normal) polarity while one or more others of the electromagnets are actuated with a second (e.g., reversed) polarity, or causing one or more of the electromagnets 122 to be differently actuated from one or more others of the electromagnets in some other manner (e.g., in terms of the relative magnitudes of the magnetic flux generated at the different electromagnets).

To illustrate such operation, FIGS. 9, 10, 11, and 12 provide respective front elevation views 900, 1000, 1100, and 1200 of portions of the magnetic cycloidal gear assembly 100 that show the same components as are present in FIGS. 5 and 6, except for the output hub 108, the bushing 214, the plurality of cam followers 110, the power/control linkages 252, and the controller 250, which are not shown. As described further below, the front elevation views 900, 1000, 1100, and 120 also include several graphical features (e.g., arrows and Xs) that illustrate behavior or interactions involving the electromagnets 122 that allow for the delivery of higher levels of torque or for achieving higher torque capacity. The front elevation views 900, 1000, 1100, and 1200 illustrate snapshots of the portions of the magnetic cycloidal gear assembly 100 during operation (e.g., at particular moments in time), when the cycloid 104 is at particular example positions relative to the stator 102 and the electromagnets 122 are actuated (or deactivated) in manners that are appropriate for the positions of the cycloid. Nevertheless, during operation of the magnetic cycloidal gear assembly 100, the cycloid 104 can take on any of a variety of other positions other than the example positions shown in FIGS. 9, 10, 11, and 12 and, when at such other positions, the electromagnets 122 can or will be actuated (or deactivated) in other manners that are appropriate for those other positions of the cycloid 104.

Although FIGS. 9, 10, 11, and 12 are described below as showing the same magnetic cycloidal gear assembly 100 as was described above in regard to FIGS. 2, 3, 4, 5, and 6, FIGS. 9, 10, 11, and 12 are intended to illustrate manners of operation that differ from the manners of operation described above. Such different manners of operation can be achieved by way of different control operations or signals provided by the controller 250 and the power/control linkages 252 if the controller 250 and power/control linkages 252 are configured to enable individualized control/actuation of the respective electromagnets 122. For example, operation in any of the manners described with reference to FIGS. 9, 10, 11, and 12 particularly can be achieved if each of the first linkage 254 and second linkage 256 takes the form of (as already mentioned above) a respective bus that includes a respective plurality of connections by which the controller 250 can be coupled respectively to different respective ones of the electromagnets 122. Given this to be the case, although the magnetic cycloidal gear assembly that is the subject of FIGS. 9, 10, 11, and 12 can be considered to be (or to be encompassed by) the magnetic cycloidal gear assembly 100 that has been described above in regard to FIGS. 2, 3, 4, 5, and 6, one can also consider the magnetic cycloidal gear assembly that is the subject of FIGS. 9, 10, 11, and 12 to be a distinct magnetic cycloidal gear assembly or system that differs from the magnetic cycloidal gear assembly 100.

Figures 9, 10:
FIG. 9 is a front elevation view of portions of the magnetic cycloidal gear assembly of FIGS. 2, 3, 4, 5, and 6 (but not including an output hub, a bushing, or a plurality of cam followers thereof), in which the portions shown in FIG. 9 have the same first rotational positions as those portions are shown to have in FIGS. 4 and 5, and which figuratively illustrates directions of example magnetic flux associated with electromagnets of the gear assembly that are actuated and how several of the electromagnets are not actuated.
FIG. 10 is a front elevation view of the same portions of the magnetic cycloidal gear assembly of FIGS. 2, 3, 4, 5, 6, and 9 that are particularly shown in FIG. 9, in which the cycloid of the gear assembly is shown to have a slightly different position than what is shown in FIG. 9 due to the gear assembly being under load, and which figuratively illustrates directions of example forces experienced by those of the electromagnets which are actuated when the gear assembly is under load.

FIGS. 9 and 10 particularly illustrate operation of the magnetic cycloidal gear assembly 100 in which certain ones of the electromagnets 122 of the magnetic cycloidal gear assembly 100 are selectively switched off at the same time when others of the electromagnets are switched on in order to deliver higher levels of torque or achieve higher torque capacity. To illustrate such operation, in addition to showing the stator 102 with the electromagnets 122 and the cycloid 104 with the permanent magnets 132, the front elevation view 900 of FIG. 9 additionally includes a plurality of outwardly-directed arrows 902. The outwardly-directed arrows 902 are respectively representative of magnetic flux passing through and out of a first plurality 904 of the electromagnets 122 that are switched on (or actuated). In general, the arrows 902 are radially-outwardly directed away from the schematic primary axis 101 or the center point 103 (see FIG. 2).

Although each of the arrows 902 of FIG. 9 is outwardly directed, the magnetic flux emanating from each of the respective electromagnets 122 of the first plurality 904 generally follows looping paths around each of those respective electromagnets. That is, after exiting each of the electromagnets 122 of the first plurality 904 (e.g., at the location of the respective arrowhead of the respective arrow 902 associated with the respective electromagnet), the magnetic flux then loops back radially-inwardly through the respective teeth 120 on the respective sides of the respective electromagnet, between the respective electromagnet and respective neighboring ones of the electromagnets, and then further loops back in an outwardly-directed manner so as to re-enter the respective electromagnet. Although not shown in FIG. 9, it should be appreciated that the magnetic flux emanating from the permanent magnets 132 of the cycloid 104 can take the same, or substantially the same, paths as described in regard to FIG. 1C.

Figure 1C:
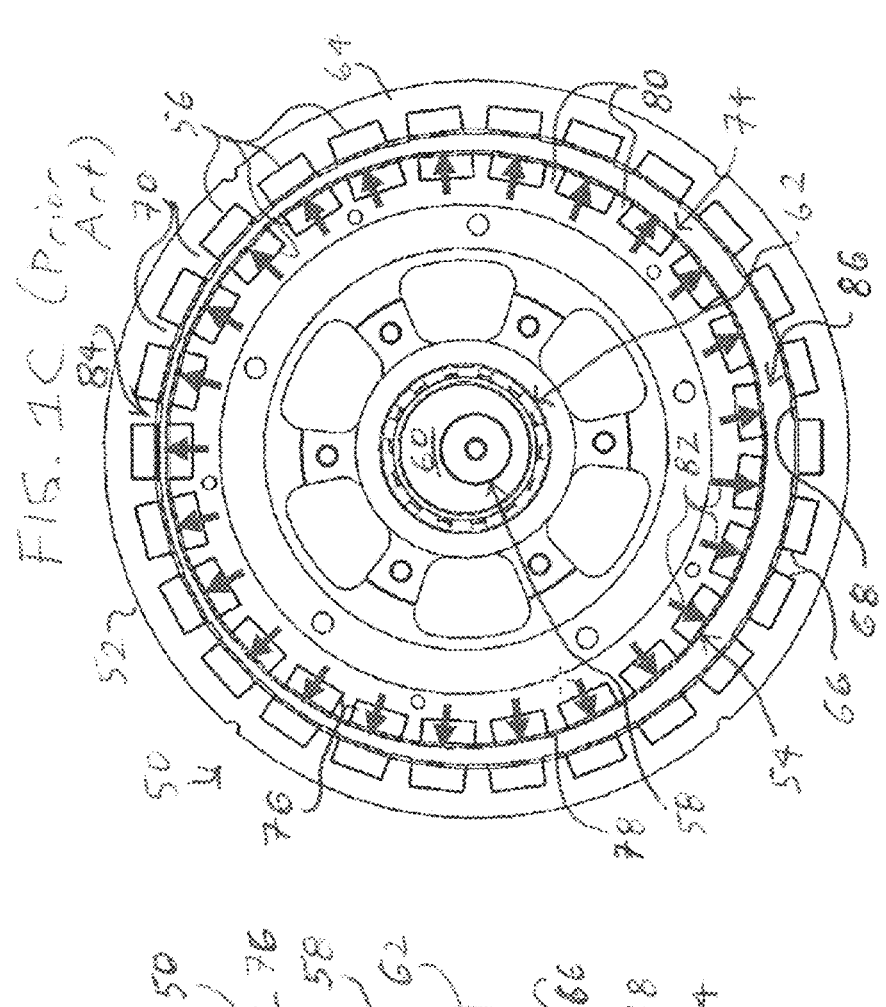
FIG. 1C is a Prior Art schematic, front elevation view of the portions of the conventional magnetic cycloid gear assembly of FIG. 1B, which figuratively illustrates directions of example magnetic flux associated with rotor magnets of the gear assembly.
Figure 1B:
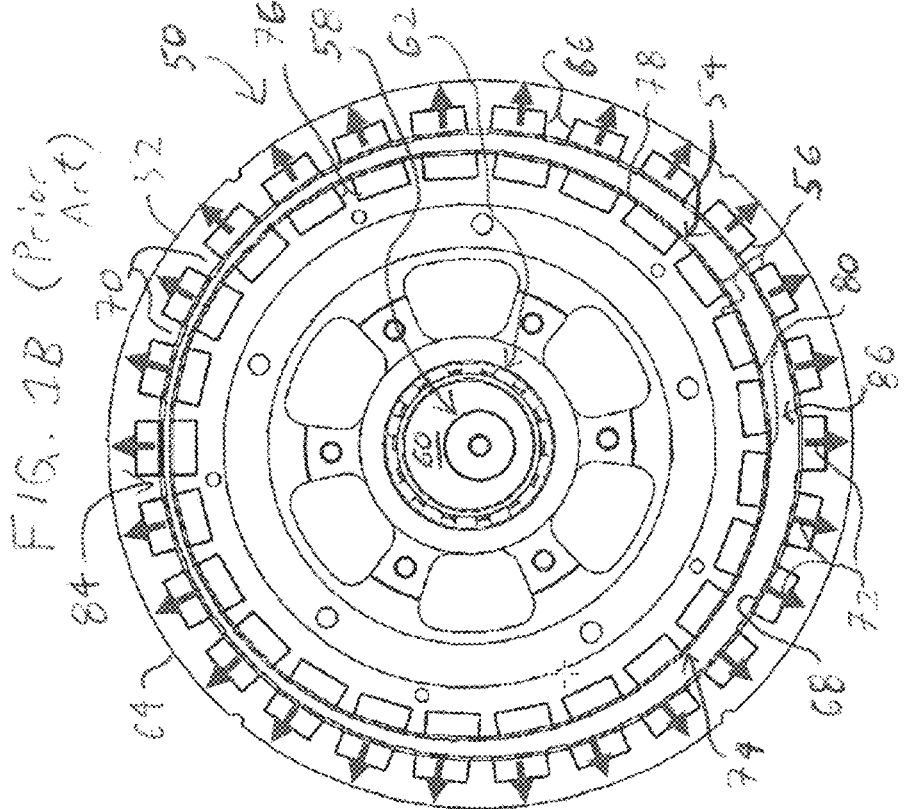
FIG. 1B is a Prior Art schematic, front elevation view of portions of a conventional magnetic cycloid gear assembly, which figuratively illustrates directions of example magnetic flux associated with stator magnets of the gear assembly.

In contrast to conventional arrangements such as that of FIGS. 1B and 1C, which employ permanent magnets on both the stator 52 and the rotor 54 to continually generate magnetic flux without interruption, FIG. 9 additionally illustrates operation of the magnetic cycloidal gear assembly 100 in which not all of the electromagnets 122 are switched on (or actuated). Rather, even though each of the electromagnets 122 of the first plurality 904 of the electromagnets is shown to be switched on as indicated by the arrows 902, FIG. 9 further indicates that each of the electromagnets of a second plurality 906 of the electromagnets is switched off, as represented by Xs 908. More particularly in this regard, the first plurality 904 of the electromagnets 122 that are switched on are those of the electromagnets that are arranged within a first arc zone 910 extending around the stator 102 that extends approximately 240 degrees, on either side of a first location 912 of minimum airgap (e.g., near the top of the stator 102 as shown in FIG. 9). In contrast, the second plurality 906 of the electromagnets 122 that are switched off particularly are those of the electromagnets that are arranged within a second arc zone 914 extending around the stator 102 that extends approximately 120 degrees, on either side of a second location 916 of maximum airgap (e.g., near the bottom of the stator 102 as shown in FIG. 9), effectively between the limits of the first arc zone 910.

It should be appreciated that, due to the switching on of the first plurality 904 of the electromagnets 122 in combination with (at the same time as) the switching off of the second plurality 906 of the electromagnets, operation of the magnetic cycloidal gear assembly 100 differs from the operation described above in regard to the conventional magnetic cycloidal gear assembly 50 of FIGS. 1B and 1C. In particular, by switching on the electromagnets 122 of the first plurality 904 but switching off the electromagnets of the second plurality 906, those of the poles of the stator 102 and cycloid 104 that are at or proximate to the first location 912 of the minimum airgap are able to effectively attract one another, but those of the poles of the stator and cycloid that are at or proximate to the second location 916 of the maximum airgap do not repel one another as would be the case in a conventional arrangement involving permanent magnets on both of the stator and rotor.

FIG. 9 illustrates an example positioning of the cycloid 104 relative to the stator 102 in an operational circumstance when no load is being borne by the magnetic cycloidal gear assembly 100 (or the cycloid 104). By comparison, FIG. 10 illustrates an example positioning of the cycloid 104 relative to the stator 102 in an alternate operational circumstance that is identical to the operational circumstance associated with FIG. 9 except insofar as, in the alternate operational circumstance of FIG. 10, a load is borne by the magnetic cycloidal gear assembly 100 via the output components thereof (e.g., by way of the output hub 108, the bushing 214, the plurality of cam followers 110). In the alternate operational circumstance of FIG. 10, each of the electromagnets 122 of the first plurality 904 of the electromagnets is switched on, and each of the electromagnets of the second plurality 906 is switched off, as was the case in the operational circumstance shown in FIG. 9. Also, in the alternate operational circumstance of FIG. 10, the first location 912 of the minimum airgap and second location 916 of the maximum airgap continue to be at the same or substantially the same respective positions (e.g., at the top and bottom of the stator 102, respectively) as shown in FIG. 9.

However, FIG. 10 shows that, due to the loading of the magnetic cycloidal gear assembly 100, the cycloid 104 has a rotational position relative to the stator 102 that is somewhat different than the rotational position of the cycloid relative to the stator shown in FIG. 9. As illustrated, the cycloid 104 has a rotational position that is rotated slightly in a clockwise manner, in a direction indicated by an arrow 1002, relative to the stator 102, by comparison with the rotational position of the cycloid relative to the stator shown in FIG. 9. Further, FIG. 10 figuratively illustrates by way of arrows 1004 the primary magnetic forces between the electromagnets 122 of the stator 102 and the permanent magnets 132 of the cycloid 104. The primary magnetic forces represented by the arrows 1004 can be understood to be the strongest magnetic forces existing between different ones of the electromagnets 122 and the permanent magnets 132, namely, the magnetic forces existing between those of the respective electromagnets 122 that are switched on and the respective ones of the permanent magnets 132 that are respectively positioned closest to those respective electromagnets.

As already described, in the operational circumstance illustrated by FIG. 10 (as well as FIG. 9), it is the electromagnets 122 of the first plurality 904 that are switched on and the electromagnets of the second plurality 906 that are switched off. Given these switching statuses, the primary magnetic forces exist between each of the electromagnets 122 of the first plurality 904 of the electromagnets on the stator 102 and the closest respective ones of the permanent magnets 132 on the cycloid 104. Accordingly, FIG. 10 shows respective ones of the arrows 1004 as extending to the respective electromagnets 122 of the first plurality 904 from closest respective ones of the permanent magnets 132 on the rotor. However, because each of the electromagnets 122 of the second plurality 906 of the electromagnets is switched off, no such primary magnetic forces exist between those electromagnets and any of the permanent magnets 132 on the cycloid 104. Accordingly, FIG. 10 does not show any of the arrows 1004 as extending to any of the electromagnets 122 of the second plurality 906. (Nor does FIG. 10 show any arrows or other features that might represent secondary magnetic forces potentially existing between the electromagnets 122 of the first plurality 904 and others of the permanent magnets 132 on the cycloid 104 other than the respective permanent magnets that are closest to those electromagnets, because overall those secondary magnetic forces are much smaller in magnitude than the primary magnetic forces.)

Given this manner of generating forces between the electromagnets 122 and the permanent magnets 132, the magnetic cycloidal gear assembly 100 is capable of achieving enhanced torque capacity by comparison with a conventional magnetic cycloidal gear assembly such as the magnetic cycloidal gear assembly 50 described above in regard to FIG. 1D. It should be appreciated from FIG. 10 that each of the arrows 1004 particularly includes a respective directional (e.g., vector) component that is opposed to the circumferential direction of the arrow 1002. That is, each of the arrows 1004 of FIG. 10 has a respective directional component that is tangent to a circle extending around the schematic primary axis 101 or the center point 103 (see FIG. 2), and/or is tangent to the inner cylindrical surface 107 of the stator 102, and that further is opposed to the direction of the arrow 1002. Thus, all of the primary forces between the electromagnets 122 and permanent magnets 132 corresponding to the arrows 1004 shown in FIG. 10 contribute positively to a torque that can be delivered by the magnetic cycloidal gear assembly 100 to a load (e.g., by way of the output components such as the output hub 108, the bushing 214, and the plurality of cam followers 110). This is in contrast to the manner of operation of the conventional magnetic cycloidal gear assembly 50 of FIG. 1D, in which some of the forces associated with some of the arrows 92 include components that diminish the torque that can be delivered (e.g., the forces represented by the arrows 92 associated with the first ones 94 of the second permanent magnets 76).

FIGS. 9 and 10 thus illustrate how the magnetic cycloidal gear assembly 100 can be operated so as to achieve enhanced torque capacity by switching off (or deactivating or disabling) certain ones of the electromagnets 122 around the stator 102 while switching on (or actuating) other ones of the electromagnets. More particularly, to achieve enhanced torque capacity, the controller 250 (via the power/control linkages 252) causes those of the electromagnets 122 that are at or proximate to the location of the maximum airgap to be switched off, while also causing the other electromagnets that are at or closer (or proximate) to the location of the minimum airgap to be switched on. As illustrated in FIG. 9 by the arrows 902 and the Xs 908, such operation maintains attractive forces at the first location of the minimum airgap 912 and avoids/alleviates repulsive forces at the second location of the maximum airgap 916. Further as illustrated in FIG. 10 by the arrows 1004, when the magnetic cycloidal gear assembly 100 is under load, the selective switching on of some of the electromagnets and turning off of others of the electromagnets (particularly those at or proximate to the maximum airgap) allows for the removal of any primary magnetic forces that do not contribute to the overall torque capacity (or net torque production), such that all primary magnetic forces contribute to rather than diminish that torque capacity.

FIGS. 11 and 12 additionally illustrate operation of the magnetic cycloidal gear assembly 100 in which certain ones of the electromagnets 122 of the magnetic cycloidal gear assembly 100 are switched on (or actuated) but selectively reversed in polarity, at the same time when others of the electromagnets are switched on with normal polarity, in order to deliver higher levels of torque or achieve higher torque capacity. To illustrate such operation, in addition to showing the stator 102 with the electromagnets 122 and the cycloid 104 with the permanent magnets 132, the front elevation view 1100 of FIG. 11 also includes both a plurality of outwardly-directed arrows 1102 and a plurality of inwardly-directed arrows 1104. The outwardly-directed arrows 1102 are respectively representative of magnetic flux passing through and out of the first plurality 904 of the electromagnets 122 that are switched on (or actuated) with normal polarity. The inwardly-directed arrows 1104 are respectively representative of magnetic flux passing through and out of the second plurality 906 of the electromagnets that are switched on with reversed polarity.

In general, the arrows 1102 are radially-outwardly directed away from, and the arrows 1104 are radially-inwardly directed toward, the schematic primary axis 101 or the center point 103 (see FIG. 2). Although each of the arrows 1102 is outwardly-directed, and each of the arrows 1104 is inwardly-directed, the magnetic flux emanating from each of the respective electromagnets 122 generally follows looping paths around the respective electromagnet. That is, after exiting each of the electromagnets 122 of the first plurality 904 (e.g., at the location of the respective arrowhead of the respective arrow 1102 associated with the respective electromagnet), the magnetic flux then loops back radially-inwardly through the respective teeth 120 on the respective sides of the respective electromagnet, between the respective electromagnet and respective neighboring ones of the electromagnets, and then further loops back in an outwardly-directed manner so as to re-enter the respective electromagnet. Likewise, after exiting each of the electromagnets 122 of the second plurality 906 (e.g., at the location of the respective arrowhead of the respective arrow 1104 associated with the respective electromagnet), the magnetic flux then loops back radially-outwardly through the respective teeth 120 on the respective sides of the respective electromagnet, between the respective electromagnet and respective neighboring ones of the electromagnets, and then further loops back in an inwardly-directed manner so as to re-enter the respective electromagnet. Although not shown in FIG. 11, it should be appreciated that the magnetic flux emanating from the permanent magnets 132 of the cycloid 104 can take the same, or substantially the same, paths as described in regard to FIG. 1C.

In the present example embodiment of FIG. 11, the first plurality 904 of the electromagnets 122 that in the present embodiment are switched on with a normal polarity are again arranged within the first arc zone 910. Also, the second plurality 906 of the electromagnets that in the present embodiment are switched on with the reversed polarity are arranged with the second arc zone 914. Thus, the difference in the manner of operation of the magnetic cycloidal gear assembly 100 illustrated by FIG. 11, relative to the manner of operation illustrated by FIG. 9, is that in FIG. 11 the second plurality 906 of the electromagnets are still actuated with the reversed polarity, rather than being switched off as in FIG. 9. Due to the actuation or switching on of the first plurality 904 of the electromagnets 122 with the normal polarity, in combination with (at the same time as) the actuation or switching on of the second plurality 906 of the electromagnets with the reversed polarity, operation of the magnetic cycloidal gear assembly 100 again differs from the operation described above in regard to the conventional magnetic cycloidal gear assembly 50 of FIGS. 1B and 1C. In particular, by switching on the electromagnets 122 of the first plurality 904 with the normal polarity and switching on the electromagnets of the second plurality 906 with the reversed polarity, those of the poles of the stator 102 and cycloid 104 that are at or proximate to the first location 912 of the minimum airgap are able to effectively attract one another. Also, in this circumstance, those of the poles of the stator 102 and cycloid 104 that are at or proximate to the second location 916 tend to attract one another rather than repel one another (as would be the case in a conventional arrangement such as that of FIGS. 1B and 1C).

It should be recognized that FIG. 11 (as with FIG. 9) illustrates an example positioning of the cycloid 104 relative to the stator 102 in an operational circumstance when no load is being borne by the magnetic cycloidal gear assembly 100 (or the cycloid 104). By comparison, FIG. 12 illustrates an example positioning of the cycloid 104 relative to the stator 102 in an alternate operational circumstance that is identical to the operational circumstance associated with FIG. 11 except insofar as, in the alternate operational circumstance of FIG. 12, a load is borne by the magnetic cycloidal gear assembly 100 via the output components thereof (e.g., by way of the output hub 108, the bushing 214, the plurality of cam followers 110). In the alternate operational circumstance of FIG. 12, each of the electromagnets 122 of the first plurality 904 of the electromagnets again is switched on with the normal polarity, and each of the electromagnets of the second plurality 906 again is switched on with the reversed polarity, as described in regard to FIG. 11. Also, in the operational circumstance of FIG. 12, the first location 912 of the minimum airgap and second location 916 of the maximum airgap continue to be at the same or substantially the same respective positions (e.g., at the top and bottom of the stator 102, respectively) as shown in FIG. 11.

However, in the alternate operational circumstance of FIG. 12, the cycloid 104 has a somewhat different rotational position relative to the stator 102 than what is shown in FIG. 11. More particularly in this regard, FIG. 12 shows that, due to the loading of the magnetic cycloidal gear assembly 10, the cycloid 104 has a rotational position relative to the stator 102 that is rotated slightly in a clockwise manner relative to the stator 102 in a direction indicated by an arrow 1202, by comparison with the rotational position of the cycloid relative to the stator shown in FIG. 11.

Further, FIG. 12 figuratively illustrates by way of first arrows 1204 and second arrows 1206 the primary magnetic forces between the electromagnets 122 of the stator 102 and the permanent magnets 132 of the cycloid 104. The primary magnetic forces represented by the first arrows 1204 can be understood to be the strongest magnetic forces existing between the electromagnets 122 of the first plurality 904 and the permanent magnets 132, namely, the magnetic forces existing between those of the respective electromagnets 122 that are switched on with the normal polarity and the respective ones of the permanent magnets 132 that are respectively positioned closest to those respective electromagnets. By contrast, the primary magnetic forces represented by the second arrows 1206 can be understood to be the strongest magnetic forces existing between the electromagnets 122 of the second plurality 906 and the permanent magnets 132, namely, the magnetic forces existing between those of the respective electromagnets 122 that are switched on with the reversed polarity and the respective ones of the permanent magnets 132 that are respectively positioned closest to those respective electromagnets. (However, FIG. 12 does not show any arrows or other features that might represent secondary magnetic forces potentially existing between the electromagnets 122 on the stator 102 and the permanent magnets 132 on the cycloid 104 other than the respective permanent magnets that are closest to those electromagnets, because overall those secondary magnetic forces are much smaller in magnitude than the primary magnetic forces.)

Given that the electromagnets 122 of the second plurality 906 are switched on with the reversed polarity, it should be appreciated that the second arrows 1206 are illustrated in FIG. 12 in a different manner than the first arrows 1204. That is, although the first arrows 1204 are illustrated as extending to the electromagnets 122 of the first plurality 904 from the closest respective ones of the permanent magnets 132, the second arrows 1206 are illustrated as extending to respective ones of the teeth 120 in between the electromagnets 122 of the second plurality 906 from the closest respective ones of the permanent magnets 132. This manner of illustrating the primary magnetic forces experienced between the electromagnets 122 of the second plurality 906 and the permanent magnets 132 is appropriate because the permanent magnets 132 proximate those electromagnets are attracted to the teeth 120 rather than to the electromagnets 122, and also insofar as the teeth 120 in between the electromagnets 122 can be effectively considered to form parts of those electromagnets 122 (as consequent poles thereof). Notwithstanding the manner in which the second arrows 1206 are illustrated in FIG. 12, it should be appreciated that there also are magnetic forces that tend to attract the electromagnets 122 of the second plurality 906 to closest respective ones of the teeth 130 on the cycloid 104 in between the closest respective ones of the permanent magnets 132.

Given this manner of generating forces between the electromagnets 122 and the permanent magnets 132, the magnetic cycloidal gear assembly 100 is capable of achieving enhanced torque capacity by comparison with a conventional magnetic cycloidal gear assembly such as the magnetic cycloidal gear assembly 50 described above in regard to FIG. 1D. It should be appreciated from FIG. 12 that each of the first arrows 1204 particularly includes a respective directional (e.g., vector) component that is opposed to the circumferential direction of the arrow 1202. That is, each of the first arrows 1204 of FIG. 12 has a respective directional component that is tangent to a circle extending around the schematic primary axis 101 or the center point 103 (see FIG. 2), and/or is tangent to the inner cylindrical surface 107 of the stator 102, and that further is opposed to the direction of the arrow 1202. Thus, all of the primary magnetic forces corresponding to the first arrows 1204 shown in FIG. 12, between the electromagnets 122 of the first plurality 904 and the permanent magnets 132 closest thereto, contribute positively to a torque that can be delivered by the magnetic cycloidal gear assembly 100 to a load (e.g., by way of the output components such as the output hub 108, the bushing 214, and the plurality of cam followers 110).

Additionally, it should further be appreciated from FIG. 12 that each of the second arrows 1206 particularly includes a respective directional component that also is opposed to the circumferential direction of the arrow 1202. That is, each of the second arrows 1206 of FIG. 12 has a respective directional component that is tangent to a circle extending around the schematic primary axis 101 or the center point 103 (see FIG. 2), and/or is tangent to the inner cylindrical surface 107 of the stator 102, and that further is opposed to the direction of the arrow 1202. Thus, all of the primary magnetic forces corresponding to the second arrows 1206 shown in FIG. 12, between the electromagnets 122 of the second plurality 906 and the permanent magnets 132 closest thereto, also contribute positively to the torque that can be delivered by the magnetic cycloidal gear assembly 100 to a load (e.g., by way of the output components such as the output hub 108, the bushing 214, and the plurality of cam followers 110). Thus, due to the reversal in the polarity of the electromagnets 122 of the second plurality 906, all of the primary magnetic forces between the permanent magnets 132 and the electromagnets 122 contribute to the overall torque that can be delivered to the load. This is in contrast to the manner of operation of the conventional magnetic cycloidal gear assembly 50 of FIG. 1D, in which some of the forces associated with some of the arrows 92 include components that diminish the torque that can be delivered (e.g., the forces represented by the arrows 92 associated with the first ones 94 of the second permanent magnets 76).

FIGS. 11 and 12 thus illustrate how the magnetic cycloidal gear assembly 100 can be operated so as to achieve enhanced torque capacity by switching on certain ones of the electromagnets 122 around the stator 102 with a normal polarity while switching on other ones of the electromagnets with a reversed polarity. More particularly, to achieve enhanced torque capacity, the controller 250 (via the power/control linkages 252) causes those of the electromagnets 122 that are at or proximate to the location of the maximum airgap to be actuated with a reversed polarity, while also causing the other electromagnets that are at or closer (or proximate) to the location of the minimum airgap to be actuated with a normal polarity. As illustrated in FIG. 11 by the outwardly-directed arrows 1102 and the inwardly-directed arrows 1104, such operation maintains attractive forces at the first location 912 of the minimum airgap and maintains some level of attractive forces at the second location 916 of the maximum airgap. Further, as illustrated in FIG. 12 by the first and second arrows 1204 and 1206, when the magnetic cycloidal gear assembly 100 is under load, the selective reversing of the polarity of certain ones of the electromagnets (e.g., those electromagnets at or proximate to the maximum/large air gap) allows for those certain ones of the electromagnets to contribute to the overall torque capacity (or net torque production) of the gear assembly, such that all primary magnetic forces contribute to rather than diminish that torque capacity.

As previously noted, the illustrations shown in FIGS. 9, 10, 11, and 12 are merely intended to represent different snapshots of the magnetic cycloidal gear assembly 100 during operation. Notwithstanding what is shown in FIGS. 9, 10, 11, and 12, it should be understood that the movements of the magnetic cycloidal gear assembly 100, and particularly the positioning of the cycloid 104 relative to the stator 102 (among other components of the gear assembly), will typically vary as the magnetic cycloidal gear assembly 100 operates. Thus, although the first location 912 of the minimum airgap and the second location 916 of the maximum airgap are respectively shown in each of FIGS. 9, 10, 11, and 12 to be proximate the top and bottom of the stator 102, respectively, the rotational positions of those locations and airgaps will vary as the cycloid 104 moves within the stator 102. Further, from the above discussion, it should be appreciated that the exact movements of the magnetic cycloidal gear assembly 100, and particularly the positioning of the cycloid 104 relative to the stator 102, can depend upon the manners or circumstances of operation, such as the manners or circumstances of operation described in regard to FIGS. 9 and 10, or 11 and 12 (e.g., whether under load).

Given this to be the case, it should additionally be understood that, to achieve desired operation with enhanced torque capacity being provided by the magnetic cycloidal gear assembly 100, the controller 250 (by way of the power/control linkages 252) should operate to continually adjust the respective actuations of the respective electromagnets 122 as the cycloid 104 moves or rotates relative to the stator 102. Indeed, notwithstanding the above description pertaining to FIGS. 9, 10, 11, and 12 concerning how the first plurality 904 of the electromagnets 122 are switched on with normal polarity and concerning how the second plurality 906 of the electromagnets are either switched off (as in FIGS. 9 and 10) or reversed in polarity (as in FIGS. 11 and 12), during operation the respective subsets of the electromagnets 122 that are encompassed by the first plurality 904 and second plurality 906 will vary with movement/rotation of the cycloid 104 and/or based upon other considerations.

For example, if (contrary to what is shown in FIGS. 9, 10, 11, and 12) at another time the cycloid 104 rotates to a position such that the first location 912 of the minimum airgap is proximate the bottom of the stator 102, then the first plurality 904 of the electromagnets 122 can potentially include all of the electromagnets arranged around the stator 102 within a 240-degree arc zone extending upwards by 120 degrees on either side of the bottom of the stator, and the second plurality 906 of the electromagnets can potentially include all of the remaining electromagnets of the stator 102 (e.g., within a 120-degree arc zone extending downward by 60 degrees on either side of the top of the stator). Correspondingly, at such a time, the controller 250 will cause those of the electromagnets 122 that are within the 240-degree arc zone to be switched on with the normal polarity. Also, at such a time, depending upon whether the magnetic cycloidal gear assembly 100 is being operated in accordance with the manner of FIGS. 9 and 10 or the manner of FIGS. 11 and 12, the controller 250 will cause those of the electromagnets 122 that are within the 120-degree arc zone either to be switched off or to be reversed in polarity.

Further in this regard, FIGS. 13 and 14 provide first and second flow charts 1300 and 1400, respectively, to show example steps of first and second methods of operation, respectively, of the magnetic cycloidal gear assembly 100. The first method of operation represented by the first flow chart 1300 particularly is a method of monitoring and controlling actuation of the electromagnets 122 by way of the controller 250 so as to achieve the manner of operation described in regard to FIGS. 9 and 10. That is, the first flow chart 1300 illustrates the method of operation in which different subsets of the electromagnets 122 are switched off or deactivated at different times or circumstances, while other subsets of the electromagnets are switched on or actuated at those respective times or circumstances, to enhance torque capacity. By contrast, the second method of operation represented by the second flow chart 1400 is a method of monitoring and controlling actuation of the electromagnets 122 by way of the controller 250 so as to achieve the manner of operation described in regard to FIGS. 11 and 12. That is, the second flow chart 1400 illustrates the method of operation in which different subsets of the electromagnets 122 are actuated with a first (e.g., normal) polarity at different times or circumstances, while other subsets of the electromagnets are actuated with a second (e.g., reversed) polarity at those respective times or circumstances, to enhance torque capacity.

More particularly with respect to FIG. 13, the first method of operation represented by the first flow chart 1300, upon starting at a start step 1302, commences operation at a step 1304 at which a rotational position of the cycloid (or rotor) 104 is sensed. The sensing can be performed at a high speed shaft, or at the input shaft 106, or alternatively at one or more other locations such as along the stator 102 (e.g., along the inner cylindrical surface 107 thereof), by way of any one or more of a variety of sensors or sensing devices or mechanisms. Upon being sensed, the sensed rotational position information is received by the controller 250, also as part of the step 1304.

Next, at a step 1306, the controller 250 determines the sign of the torque produced by each one of the electromagnets (or electromagnetic coils) 122 on the stator 102. In performing this operation, it will be appreciated that the controller 250 can, based upon the sensed information regarding the rotational position of the cycloid 104 obtained at the step 1304, determine the position of each of the permanent magnets 132 of the cycloid 104 relative to the position of each of the electromagnets 122 of the stator 102. Based upon these determinations of the relative positions, the controller 250 is further configured to determine whether the magnetic flux paths of the respective permanent magnets 132 are aligned with the magnetic flux paths of the respective electromagnets 122 that are positioned closest to those respective permanent magnets. Also, based upon these determinations of the relative positions, the controller 250 is additionally configured to determine whether the primary magnetic forces between the respective electromagnets 122 and the respective permanent magnets 132 positioned closest to those respective electromagnets tend to contribute positively to the torque output of the magnetic cycloidal gear assembly 100 or tend to diminish that torque output. If the primary magnetic force between a respective one of the electromagnets 122 and a corresponding (closest) respective one of the permanent magnets 132 contributes positively or adds to the torque output, the respective electromagnet can be determined to produce (or be assigned) a positive torque sign. Alternatively, if the primary magnetic force between a respective one of the electromagnets 122 and a corresponding (closest) respective one of the permanent magnets 132 contributes negatively to or diminishes the torque output, the respective electromagnet can be determined to produce (or be assigned) a negative torque sign.

Subsequently, at a step 1308, the controller 250 generates or outputs control signals and communicates those control signals via the power/control linages 252 based upon the torque sign determinations to cause certain ones of the electromagnets 122 to be (or stay) switched on and to cause other ones of the electromagnets to be switched off. More particularly, the controller 250 will output and communicate control signals to each of the electromagnets 122 so that only those of the electromagnets (or electromagnetic coils) producing the desired sign of torque will be switched on or energized. For example, in the operational circumstance shown in FIGS. 9 and 10, the controller 250 can determine that the electromagnets 122 of the first plurality 904 have a positive sign of torque and cause those electromagnets to be actuated, and further determine that the electromagnets of the second plurality 906 have a negative sign of torque and cause those electromagnets to be deactivated.

The controller 250 can govern the operations of the respective electromagnets 122 on an individualized basis. For example, as already mentioned, the power/control linkages 252 can include busses by which the controller 250 can be in direct communication with and exert control over the actuation/operation of each of the electromagnets 122. In some embodiments or circumstances, the controller 250 can serve as a driver that controls the respective operations/actuations of the respective electromagnets 122 by supplying (or refraining from supplying) the respective actuating currents directly to the respective electromagnets. In other embodiments or circumstances, the controller 250 can output control signals to other devices that govern the respective operations/actuations of the respective electromagnets. For example, in some embodiments, the controller 250 can provide signals via the power/control linkages 252 to govern individual on/off circuitry (e.g., individualized switches controlled by the controller 250) to control the actuation of each of the electromagnets 122.

Upon completion of the step 1308, as indicated by a step 1310, the first method will often be repeated and return to the step 1304. Indeed, during operation of the magnetic cycloidal gear assembly 100, the steps of the first method can be repeated numerous times at a high frequency so that the controller 250 has sufficient information to modify the actuation status of the electromagnets 122 repeatedly and in a timely manner as the cycloid 104 moves relative to the stator 102. During typical operation, the respective currents that are applied to the respective electromagnets 122 will change as the cycloid 104 moves within the stator 102, based upon whether the respective electromagnet 122 is closer or farther from the minimum air gap (or farther or closer from the maximum air gap). In general, the controller 250 will cause each of the electromagnets 122 to be actuated (to conduct current) at certain respective times corresponding to certain positions of the cycloid 104), and to be deactivated (to not conduct current) at other respective times corresponding to other positions of the cycloid.

Alternatively, as also represented by the step 1310, at some point in time when operation of the magnetic cycloidal gear assembly 100 is no longer sought or needed, then the method can also end (that is, the step 1310 can also be considered an end step of the process).

Additionally with respect to FIG. 14, the second method of operation represented by the first flow chart 1400, upon starting at a start step 1402, commences operation at a step 1404 at which a rotational position of the cycloid (or rotor) 104 is sensed. The sensing can be performed at a high speed shaft, or at the input shaft 106, or alternatively at one or more other locations such as along the stator 102 (e.g., along the inner cylindrical surface 107 thereof), by way of any one or more of a variety of sensors or sensing devices or mechanisms. Upon being sensed, the sensed rotational position information is received by the controller 250, also as part of the step 1404.

Next, at a step 1406, the controller 250 determines the sign of the torque produced by each one of the electromagnets (or electromagnetic coils) 122 on the stator 102, so as to allow for a determination as to which of the electromagnets should be actuated with a normal polarity by application of a first current type (e.g., a positive current) or actuated with a reverse polarity by application of a second current type (e.g., negative current). In performing this operation, it will again be appreciated (as with respect to the step 1306 discussed above) that the controller 250 can, based upon the sensed information regarding the rotational position of the cycloid 104 obtained at the step 1404, determine the position of each of the permanent magnets 132 of the cycloid 104 relative to the position of each of the electromagnets 122 of the stator 102. Based upon these determinations of the relative positions, the controller 250 is further configured to determine whether the magnetic flux paths of the respective permanent magnets 132 are aligned with the magnetic flux paths of the respective electromagnets 122 that are positioned closest to those respective permanent magnets. Also, based upon these determinations of the relative positions, the controller 250 is additionally configured to determine whether the primary magnetic forces between the respective electromagnets 122 and the respective permanent magnets 132 positioned closest to those respective electromagnets tend to contribute positively to the torque output of the magnetic cycloidal gear assembly 100 or tend to diminish that torque output. If the primary magnetic force between a respective one of the electromagnets 122 and a corresponding (closest) respective one of the permanent magnets 132 contributes positively or adds to the torque output, the respective electromagnet can be determined to produce (or be assigned) a positive torque sign. Alternatively, if the primary magnetic force between a respective one of the electromagnets 122 and a corresponding (closest) respective one of the permanent magnets 132 contributes negatively to or diminishes the torque output, the respective electromagnet can be determined to produce (or be assigned) a negative torque sign.

Subsequently, at a step 1408, the controller 250 generates or outputs control signals and communicates those control signals via the power/control linages 252 based upon the torque sign determinations to cause positive currents to be applied to one or more of the electromagnets 122 that were determined to produce positive torque signs. More particularly, the controller 250 will output and communicate control signals to those of the electromagnets (or electromagnetic coils) 122 producing the positive sign of torque so that those electromagnets will be switched on or energized with positive currents. Additionally, at a step 1410, the controller 250 generates or outputs control signals and communicates those control signals via the power/control linkages 252 based upon the torque sign determinations to cause negative currents to be applied to one or more of the electromagnets 122 that were determined to produce negative (or undesired)

torque signs. More particularly, the controller 250 will output and communicate control signals to those of the electromagnets (or electromagnetic coils) 122 producing the negative sign of torque so that those electromagnets will be switched on or energized with negative currents.

At the steps 1408 and 1410, the controller 250 particularly can achieve polarity control of each of the electromagnets by controlling the directions of currents flowing through the respective electromagnets. For example, with respect to the operational circumstance shown in FIGS. 11 and 12, the controller 250 can determine that the electromagnets of the first plurality 904 have a positive (or desired) sign of torque and cause positive (e.g., normal polarity) currents to be applied to those electromagnets, and additionally can determine that the electromagnets of the second plurality 906 have a negative (or undesired) sign of torque and cause negative (e.g., reversed polarity) currents to be applied to those electromagnets.

Further in regard to each of the step 1408 and step 1410, the controller 250 can govern the operations of the respective electromagnets 122 on an individualized basis. For example, as already mentioned, the power/control linkages 252 can include busses by which the controller 250 can be in direct communication with and exert control over the actuation/operation of each of the electromagnets 122. In some embodiments or circumstances, the controller 250 can serve as a driver that controls the respective operations/actuations of the respective electromagnets 122 by supplying the respective actuating currents directly to the respective electromagnets. In other embodiments or circumstances, the controller 250 can output control signals to other devices that govern the respective operations/actuations of the respective electromagnets. For example, in some embodiments, the controller 250 can provide signals via the power/control linkages 252 to govern individual on/off circuitry (e.g., individualized switches controlled by the controller 250) to control the actuation of each of the electromagnets 122.

Upon completion of the step 1410, as indicated by a step 1412, the second method will often be repeated and return to the step 1404. Indeed, during operation of the magnetic cycloidal gear assembly 100, the steps of the second method can be repeated numerous times at a high frequency so that the controller 250 has sufficient information to modify the actuation status of the electromagnets 122 repeatedly and in a timely manner as the cycloid 104 moves relative to the stator 102. As already mentioned, during typical operation, the respective currents that are applied to the respective electromagnets 122 will change as the cycloid 104 moves within the stator 102, based upon whether the respective electromagnet 122 is closer or farther from the minimum air gap (or farther or closer from the maximum air gap). In general, the controller 250 will cause each of the electromagnets 122 to conduct a normal-polarity current at certain respective times (corresponding to certain positions of the cycloid 104) and to conduct a reversed-polarity current at other respective times (corresponding to other positions of the cycloid).

Alternatively, as also represented by the step 1412, at some point in time when operation of the magnetic cycloidal gear assembly 100 is no longer sought or needed, then the method can also end (that is, the step 1412 can also be considered an end step of the process).

Notwithstanding the above description, the present disclosure is intended to encompass numerous alternate embodiments. For example, although the electromagnets can be located on the stator 102 as shown in FIGS. 2, 4, 5,

6, 9, 10, 11, and 12, electromagnets can alternatively be mounted on the cycloid 104 (or rotor), or be mounted on each of the stator and the cycloid. Also, although FIGS. 2, 4, 5, 6, 9, 10, 11, and 12 concern the application of electromagnets and electromagnetic control to a particular example topology of a magnetic cycloidal gear assembly, the present disclosure is intended to encompass numerous other typologies including not only other typologies of cycloidal gears but also other topologies such as ones involving coaxial magnetic gears, magnetic spur gears, and other types of gears and gear arrangements.

Additionally, notwithstanding the above description, the controller 250 and power/control linkages 252 can take a variety of other forms depending upon the embodiment or circumstance, in addition to those described above. As already noted above, in some embodiments, the power/control linkages 252 can include one or more busses, where each bus includes a respective plurality of connections by which the controller 250 is coupled to the respective electromagnets. Additionally, in some alternate embodiments, the power/control linkages include a plurality of different linkages that are respectively coupled to different respective ones of the electromagnets 122, even if those different linkages are not included within busses. Also, in some alternate embodiments, the controller can provide control signals to the electromagnets 122 (or to actuating devices for such electromagnets, such as individualized switches) at least in part by way of wireless communication links (which can, for example, form portions of the power/control linkages 252).

Further as already noted above, in some embodiments, all of the electromagnets 122 need not be powered simultaneously. Rather, the controller 250 can actuate the different ones of the electromagnets 122 at respectively different times and/or in respectively different manners. In this regard, the present disclosure particularly has described above the simultaneous application of currents in one or more electromagnets while no currents are applied to one or more other electromagnets, as well as the simultaneous application of first-polarity (e.g., normal polarity) currents to one or more electromagnets while second-polarity (e.g., reversed polarity) currents are applied to one or more other electromagnets.

Nevertheless, the present disclosure also envisions other manners of actuating (or refraining from actuating) different ones of the electromagnets at the same time differently, and/or the application of other types of currents to various electromagnets of a magnetic cycloidal gear assembly. Indeed, for example, in some such embodiments, different respective actuating electrical currents can be applied by the controller 250 respectively to different ones of the electromagnets 122 so that different respective magnetic fields are generated by the different electromagnets (e.g., magnetic fields with different magnitudes or occurring at different times). Indeed, the present disclosure encompasses embodiments in which currents of different magnitudes are applied to different electromagnets of a magnetic cycloidal gear assembly. Also, for example, although it is envisioned above that the controller 250 will provide direct current (DC) power to the electromagnets 122 in the magnetic cycloidal gear assembly 100 of FIGS. 2-6 and 9-12 described above, in other embodiments other forms of power (or current or voltage) can be provided to one or more of the electromagnets, such as alternating current (AC) power.

The present disclosure further envisions and encompasses alternate embodiments in which the operation of electromagnets as controlled by a controller (e.g., via power/control linkages) occurs in any of a variety of different or additional manners. In at least some such alternate embodiments, control of the electromagnets (or windings or coils) permits improved performance of the magnetic cycloidal gear assembly (or gearbox) by comparison with magnetic cycloidal gear assemblies (or gearboxes) that only employ permanent magnets but not electromagnets. Also, in at least some such alternate embodiments, the electromagnets (or windings or coils) can be controlled in any of a variety of modulated manners to achieve any of a variety of goals.

For example, in one such alternate embodiment, the controller can operate to modulate the electromagnets on the stator (e.g., the stator windings or coils) to "lead" the cycloid, so as to improve the output speed of the system at a given input torque over what a motor alone would be able to achieve. Also for example, in an additional such alternate embodiment, the controller can operate to modulate the electromagnets on the stator (e.g., the stator windings or coils) in a manner such that the gearbox operates at a different gear ratio than the inherent gear ratio, potentially optimizing for motor power or some other parameter. Further for example, in another such alternate embodiment, the controller can operate to modulate the electromagnets on the stator (e.g., the stator windings or coils) in a manner that reduces or minimizes the forces on the input shaft (e.g., magnetic and centripetal forces), so as to reduce the burden on the shaft and bearings, and potentially reduce the size and weight of the counterweight/counterbalance.

Additionally for example, in a further such alternate embodiment, the controller can operate to modulate the electromagnets on the stator (e.g., the stator windings or coils) in a manner that is independent of the motor to provide small or high frequency position adjustments. Also for example, in an additional such alternate embodiment, the controller can operate to modulate the electromagnets on the stator (e.g., the stator windings or coils) with respect to torque to improve the stiffness of the gearbox. Although each of these alternate embodiments involving various types of modulation particularly involves modulation of the electromagnets on the stator (or the power or currents delivered thereto), the present disclosure also is intended to encompass embodiments that involve modulation of electromagnets on a cycloid or rotor, instead of (or in addition to) modulation of electromagnets on a stator.

One or more of the embodiments encompassed herein can be advantageous in any of a variety of respects. For example, in at least some embodiments, the benefits of the technology include the ability to achieve very high gear ratios in a single stage, true zero-backlash operation, as well as reduced wear, reduced noise and improved reliability and life due to the lack of mechanically meshing gear teeth. Also for example, with respect to at least some embodiments encompassed herein, because the magnetic cycloidal gear assemblies (or gearboxes) employ electromagnets, the magnetic cycloidal gear assemblies can operate both as conventional magnetic gearboxes when powered (e.g., during a normal mode of operation), and also can "disengage" to allow freewheeling of the output when necessary (e.g., during a clutch mode of operation).

Further for example, with respect to at least some embodiments encompassed herein, any of a variety of different types of control over the actuation and deactivation (and/or modulation) of one or more of the electromagnets of a magnetic cycloidal gear assembly can be performed in order to achieve any of a variety of different types of operation. In particular, in at least some embodiments encompassed herein, a magnetic cycloidal gear assembly with enhanced torque capacity is achieved by causing different respective ones of the electromagnets to be actuated differently at any given time, and also actuated in a time-varying manner (such that the actuation status of any given one of the electromagnets changes over time) as the cycloid moves relative to the stator of the magnetic cycloidal gear assembly. As discussed above, depending upon the embodiment or operational circumstance, such differential manners of actuation can involve, for example, selectively actuating certain one(s) of the electromagnets while other one(s) of the electromagnets are deactivated or, also for example, selectively actuating certain one(s) of the electromagnets to have a first polarity while other one(s) of the electromagnets are actuated to have a second polarity. Additionally, the present disclosure is not limited to the embodiments employing magnetic cycloidal arrangements but rather encompasses embodiments having other structures and arrangements as well.

It is specifically intended that the present invention not be limited to the embodiments and illustrations contained herein, but include modified forms of those embodiments including portions of the embodiments and combinations of elements of different embodiments as come within the scope of the following claims.

What is claimed is:
1. An electromagnetically-controlled magnetic cycloidal gear assembly for a rotational power transmission comprising:
  a stator that is fixed and concentric with respect to a primary axis of the magnetic cycloidal gear assembly, and that includes a plurality of electromagnets;
  an input shaft that is configured to receive input power from a source external of the electromagnetically-controlled magnetic cycloidal gear assembly, that is configured to rotate about the primary axis and that includes an offset cam that is offset with respect to the primary axis;
  a cycloid mounted at least indirectly upon the offset cam and configured to rotate both relative to the offset cam and also within the stator, wherein the cycloid is eccentric with respect to the primary axis and includes a plurality of permanent magnets;
  an output hub that is concentric with the primary axis and that is coupled at least indirectly to the cycloid so that output torque and speed can be at least indirectly communicated to the output hub from the cycloid; and
  a controller coupled at least indirectly to the electromagnets or coupled at least indirectly to a plurality of control devices that respectively are coupled to the electromagnets, respectively,
  wherein at a first time the controller operates (a) to generate at least one first output signal that is configured to cause each of a first subset of the electromagnets to produce a respective first magnetic flux with a first polarity, and (b) either to generate at least one second output signal that is configured to cause each of a second subset of the electromagnets to produce a respective second magnetic flux with a second polarity that is opposite to the first polarity or that is configured to cause each of the second subset of the electromagnets to be switched off, or to refrain from generating the at least one second output signal so that each of the second subset of the electromagnets is switched off, and
  wherein the electromagnetically-controlled magnetic cycloidal gear assembly thereby is configured to transmit at least some of the input power received from the source by the input shaft to the output hub.

2. The electromagnetically-controlled magnetic cycloid gear assembly of claim 1, wherein at the first time the electromagnets of the first subset are arranged at or proximate to a first location at which a minimum air gap exists between the stator and the cycloid, and additionally at the first time the electromagnets of the second subset are arranged at or proximate to a second location at which a maximum air gap exists between the stator and the cycloid.

3. The electromagnetically-controlled magnetic cycloidal gear assembly of claim 2, wherein at a second time the controller operates (a) to generate at least one third output signal that is configured to cause each of a third subset of the electromagnets to produce a respective third magnetic flux with the first polarity, and (b) either to generate at least one fourth output signal that is configured to cause each of a fourth subset of the electromagnets to produce a respective fourth magnetic flux with the second polarity that is opposite to the first polarity or that is configured to cause each of the fourth subset of the electromagnets to be switched off, or to refrain from generating the at least one second output signal so that each of the fourth subset of the electromagnets is switched off.

4. The electromagnetically-controlled magnetic cycloidal gear assembly of claim 3, wherein the second time is subsequent to the first time, and wherein at the second time the electromagnets of the third subset are arranged at or proximate to a third location at which the minimum air gap exists between the stator and the cycloid, and additionally at the second time the electromagnets of the fourth subset are arranged at or proximate to a fourth location at which the maximum air gap exists between the stator and the cycloid.

5. The electromagnetically-controlled magnetic cycloidal gear assembly of claim 2, wherein at the first time the controller operates (a) to generate the at least one first output signal that is configured to cause each of the first subset of the electromagnets to produce the respective first magnetic flux with the first polarity, so that first primary magnetic forces occur between the respective electromagnets of the first subset and respective ones of the permanent magnets that are respectively closest to the respective electromagnets of the first subset, and (b) to generate the at least one second output signal that is configured to cause each of the second subset of the electromagnets to produce the respective second magnetic flux with the second polarity that is opposite to the first polarity, so that second primary magnetic forces occur between the respective electromagnets of the second subset and respective ones of the permanent magnets that are respectively closest to the respective electromagnets of the second subset, and
  wherein each of the first primary magnetic forces and the second primary magnetic forces includes a respective directional component that tends to increase an overall torque output of the electromagnetically-controlled magnetic cycloidal gear assembly.

6. The electromagnetically-controlled magnetic cycloidal gear assembly of claim 2, wherein at the first time the controller operates (a) to generate the at least one first output signal that is configured to cause each of the first subset of the electromagnets to produce the respective first magnetic flux with the first polarity, so that first primary magnetic forces occur between the respective electromagnets of the first subset and respective ones of the permanent magnets that are respectively closest to the respective electromagnets of the first subset, and (b) to generate the at least one second output signal that is configured to cause each of the second subset of the electromagnets to be switched off, or to refrain from generating the at least one second output signal so that each of the second subset of the electromagnets is switched off, wherein contributions to an overall torque output of the electromagnetically-controlled magnetic cycloidal gear assembly by the first primary magnetic forces are not reduced by any additional magnetic forces occurring between the respective electromagnets of the second subset and respective ones of the permanent magnets that are respectively closest to the respective electromagnets of the second subset.

7. The electromagnetically-controlled magnetic cycloidal gear assembly of claim 2, further comprising a plurality of connections, wherein the controller is coupled to each of the electromagnets respectively at least in part by way of a respective one of the connections.

8. The electromagnetically-controlled magnetic cycloidal gear assembly of claim 7, wherein the at least one first output signal includes a first plurality of currents that are directed to flow through the respective electromagnets of the first plurality and thereby generate the respective first magnetic fluxes, and wherein the at least one second output signal includes a second plurality of current signals that are directed to flow through the respective electromagnets of the second plurality and thereby generate the respective second magnetic fluxes.

9. The electromagnetically-controlled magnetic cycloidal gear assembly of claim 2, further comprising a plurality of connections, wherein the controller is coupled to each of the control devices respectively at least in part by way of a respective one of the connections.

10. The electromagnetically-controlled magnetic cycloidal gear assembly of claim 9, wherein the at least one first output signal causes a first subset of the control devices to enable a first plurality of currents to flow through the respective electromagnets of the first plurality and thereby generate the respective first magnetic fluxes, and wherein the at least one second output signal causes a second subset of the control devices to enable a second plurality of currents to flow through the respective electromagnets of the second plurality and thereby generate the respective second magnetic fluxes.

11. The electromagnetically-controlled magnetic cycloidal gear assembly of claim 1, wherein the controller includes at least one of a microprocessor and a driver, and further comprising a housing, wherein the source is external of the housing.

* * * * *